(12) United States Patent
Yamada et al.

(10) Patent No.: US 8,864,170 B2
(45) Date of Patent: Oct. 21, 2014

(54) AIRBAG FOR A FRONT PASSENGER'S SEAT

(71) Applicant: Toyoda Gosei Co., Ltd., Kiyosu (JP)

(72) Inventors: Ikuo Yamada, Kiyosu (JP); Shinichi Ishida, Kiyosu (JP); Masashi Hashiba, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/897,697

(22) Filed: May 20, 2013

(65) Prior Publication Data

US 2013/0320656 A1 Dec. 5, 2013

(30) Foreign Application Priority Data

May 31, 2012 (JP) .................................. 2012-125040

(51) Int. Cl.
*B60R 21/16* (2006.01)
*B60R 21/205* (2011.01)
*B60R 21/2338* (2011.01)
*B60R 21/239* (2006.01)

(52) U.S. Cl.
CPC ........... *B60R 21/2338* (2013.01); *B60R 21/205* (2013.01); *B60R 2021/23384* (2013.01); *B60R 2021/2395* (2013.01)
USPC .......................... 280/743.2; 280/732; 280/752

(58) Field of Classification Search
USPC ........................................ 280/732, 743.2, 752
See application file for complete search history.

(56) References Cited

U.S. PATENT DOCUMENTS

| 3,879,056 | A | 4/1975 | Kawashima et al. | |
| 7,484,757 | B2 * | 2/2009 | Thomas et al. | 280/743.2 |
| 7,600,782 | B2 * | 10/2009 | Ishiguro et al. | 280/739 |
| 7,845,678 | B2 * | 12/2010 | Pausch | 280/735 |
| 8,371,612 | B2 | 2/2013 | Williams | |
| 2002/0084638 | A1 * | 7/2002 | Neupert | 280/743.1 |
| 2006/0197329 | A1 * | 9/2006 | Asano et al. | 280/743.1 |
| 2007/0024032 | A1 * | 2/2007 | Hasebe | 280/729 |
| 2007/0024043 | A1 * | 2/2007 | Abe | 280/743.2 |
| 2007/0045997 | A1 * | 3/2007 | Abe et al. | 280/729 |
| 2007/0205591 | A1 * | 9/2007 | Bito | 280/743.2 |
| 2009/0146404 | A1 * | 6/2009 | Furuno et al. | 280/732 |
| 2011/0062693 | A1 * | 3/2011 | Williams | 280/743.2 |

FOREIGN PATENT DOCUMENTS

JP 2008-254500 A 10/2008

* cited by examiner

*Primary Examiner* — Paul N Dickson
*Assistant Examiner* — Darlene P Condra
(74) *Attorney, Agent, or Firm* — Posz Law Group, PLC

(57) ABSTRACT

A bag body of an airbag includes a recessed area that is sunken forward and extends vertically generally at the center in a left and right direction of the passenger side wall. The airbag internally includes a vertical tether that pulls the front end of the recessed area forward at airbag deployment. The airbag further includes two horizontal tethers; an upper horizontal tether and a lower horizontal tether, which connect the left side wall and right side wall of the bag body, respectively, and are deployable generally in a left and right direction in order to limit the clearance between the left side wall and right side wall. The upper horizontal tether is located in an area above the vertical tether and the lower horizontal tether is located in an area below the vertical tether.

7 Claims, 19 Drawing Sheets

AIRBAG FOR A FRONT PASSENGER'S SEAT

CROSS REFERENCE TO RELATED APPLICATIONS

The Present application claims priority from Japanese Patent Application No. 2012-125040 of Yamada et al., filed on May 31, 2012, the disclosure of which is hereby incorporated into the present application by reference.

BACKGROUND OF THE INVENTION

1. Field of the Invention

The present invention relates to a passenger airbag adapted to be stored inside an instrument panel located in front of a front passenger's seat of a vehicle. Particularly, the invention relates to a passenger airbag for rearward deployment from the instrument panel when fed with an inflation gas, the airbag including a bag body and a tether located inside the bag body for controlling the shape of the bag body as deployed.

2. Description of Related Art

JP 2008-254500 A discloses a known passenger airbag whose bag body is internally provided with a tether. The bag body takes such a shape at full inflation that a passenger side wall deployable at the rear end has a recessed area that is sunken forward generally entirely in an up and down direction at the center in a left and right direction. The tether is located inside the bag body in order to pull the front end of the recessed area of the passenger side wall forward at airbag deployment.

The tether helps prevent the front end of the recessed area from protruding toward a passenger unduly along with the deployment of the passenger side wall in an initial stage of airbag deployment.

Although this conventional passenger airbag is advantageous in preventing the passenger side wall from protruding toward a front passenger's seat in an initial stage of airbag deployment, it cannot help unfurling in a left and right direction unduly during inflation, which is likely to hinder a quick deployment of the airbag. Therefore, the conventional passenger airbag has room for improvement in restraining undue expansion in a left and right direction.

SUMMARY OF THE INVENTION

An object of the present invention is to provide an airbag for a front passenger's seat that is capable of completing inflation quickly while controlling its shape in an initial stage of inflation.

The airbag for a front passenger's seat of the invention includes:
- a folded-up bag body adapted to be mounted on an instrument panel located in front of a front passenger's seat for rearward deployment, the bag body being inflatable generally into a square cone whose top is at a front end of the bag body and including:
  - a passenger side wall deployable at a rear end of the bag body generally vertically and toward the front passenger seat;
  - a circumferential wall extending toward the front end of the bag body from a peripheral edge of the passenger side wall while tapering;
  - a gas inlet port located proximate the front end of the bag body as inflated for introducing an inflation gas; and
  - a recessed area that is sunken forward and extends vertically generally at the center in a left and right direction of the passenger side wall;
  - a vertical tether that is located inside the airbag body for pulling a front end of the recessed area forward at airbag deployment for controlling a shape of the bag body as inflated;
  - an upper horizontal tether that is located inside the bag body and connects a left side wall and a right side wall of the circumferential wall which oppose each other in a left and right direction, the tether being deployable generally along a left and right direction in an area above the vertical tether in order to limit a clearance between the left side wall and right side wall at airbag deployment; and
  - a lower horizontal tether that is located inside the bag body and connects the left side wall and the right side wall of the circumferential wall, the lower horizontal tether being deployable generally along a left and right direction in an area below the vertical tether in order to limit the clearance between the left side wall and right side wall at airbag deployment.

With this configuration, since the airbag body internally includes the vertical tether that connects the front end of the recessed area and the periphery of the gas inlet port and horizontal tethers that connects the left side wall and right side wall of the circumferential wall, in an early stage of airbag deployment, the vertical tether pulls the front end of the recessed area forward and prevents a region of the bag body around the front end of the recessed area from protruding toward a front passenger seat unduly, and then the horizontal tether prevents the bag body from unfurling in a left and right direction too much. More specifically, when the bag body begins to inflate with an inflation gas, the bag body firstly develops rearward in a thin state with a little gas inside. The rearward protrusion of the bag body then stops when the vertical tether fully tautens, and then the vertical tether is pulled forward due to rebound action, such that the bag body unfurls in a left and right direction and the left side wall and right side wall are separated from each other. If the bag body is not provided with the horizontal tethers, the bag body would unfurl further in a left and right direction and then protrude rearward in such a manner as to expand in a front and rear direction due to subsequent rebound action, and would complete inflation while oscillating after repeating rearward protrusion and lateral expansion due to rebound actions. However, since the airbag of the invention is internally provided with the horizontal tethers that connect the left side wall and right side wall, the horizontal tethers will prevent the left sidewall and right side wall from separating from each other unduly, and will help prevent the repetition of rebound actions of rearward protrusion and lateral expansion, and oscillating motion of the bag body.

Especially, since the horizontal tethers are located above and below the vertical tether, the clearance between the left side wall and right side wall are adequately controlled by the horizontal tethers in a wide range in an up and down direction. Thus the bag body of the airbag is capable of controlling its shape in an initial stage of deployment with the vertical tether which prevents rearward protrusion and with the horizontal tethers (the upper horizontal tether and lower horizontal tether) which prevent undue expansion in a left and right direction, and accordingly is capable of inflating quickly.

Therefore, the airbag of the invention is capable of inflating quickly while controlling its shape in an initial stage of deployment.

In the airbag of the invention, it is desired that:
the upper and lower horizontal tethers are fabricated of a flexible sheet material and formed generally into a band;

the upper horizontal tether is so slanted off a front and rear direction as viewed from a side that a rear end of the upper horizontal tether is located above a front end of the upper horizontal tether at airbag deployment; and the lower horizontal tether is so slanted off a front and rear direction as viewed from a side that a rear end of the lower horizontal tether is located below a front end of the lower horizontal tether at airbag deployment.

With this configuration, the band-shaped tethers connect the left side wall and right side wall over a wide range and reduce the volume of the bag body, thus helps shorten the time taken till full inflation. Moreover, since the upper horizontal tether is so slanted off a front and rear direction as viewed from a side that the rear end is located above the front end at airbag deployment whereas the lower horizontal tether is so slanted off a front and rear direction as viewed from a side that the rear end is located below the front end at airbag deployment, in an initial stage of airbag inflation, the upper and lower horizontal tethers will direct an inflation gas introduced from the gas inlet port rear- and upward and rear- and downward, toward the passenger side wall, respectively, thereby unfurling the bag body quickly in an up and down direction. When the inflation gas having reached the passenger side wall turns and flows forward, the horizontal tethers will also direct the gas forward. That is, the horizontal tethers serve as redirecting cloths of an inflation gas.

Moreover, if the upper horizontal tether is arranged to extend generally in parallel to a windshield of a vehicle located above the instrument panel at airbag deployment, the upper horizontal tether will direct an inflation gas fed to the bag body to flow through the tether itself and an upper area of the circumferential wall, along the windshield, thus preventing the gas from heading toward a front passenger's seat.

Furthermore, if the lower horizontal tether is arranged to extend generally in parallel to a tangential direction at generally a center of a curve of an area of a rear plane of the dashboard to contact with the bag body at airbag deployment, the lower horizontal tether will direct an inflation gas fed to the bag body to flow through the tether itself and a lower area of the circumferential wall, along the rear plane of the dashboard, and prevent the gas from heading toward a front passenger's seat.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
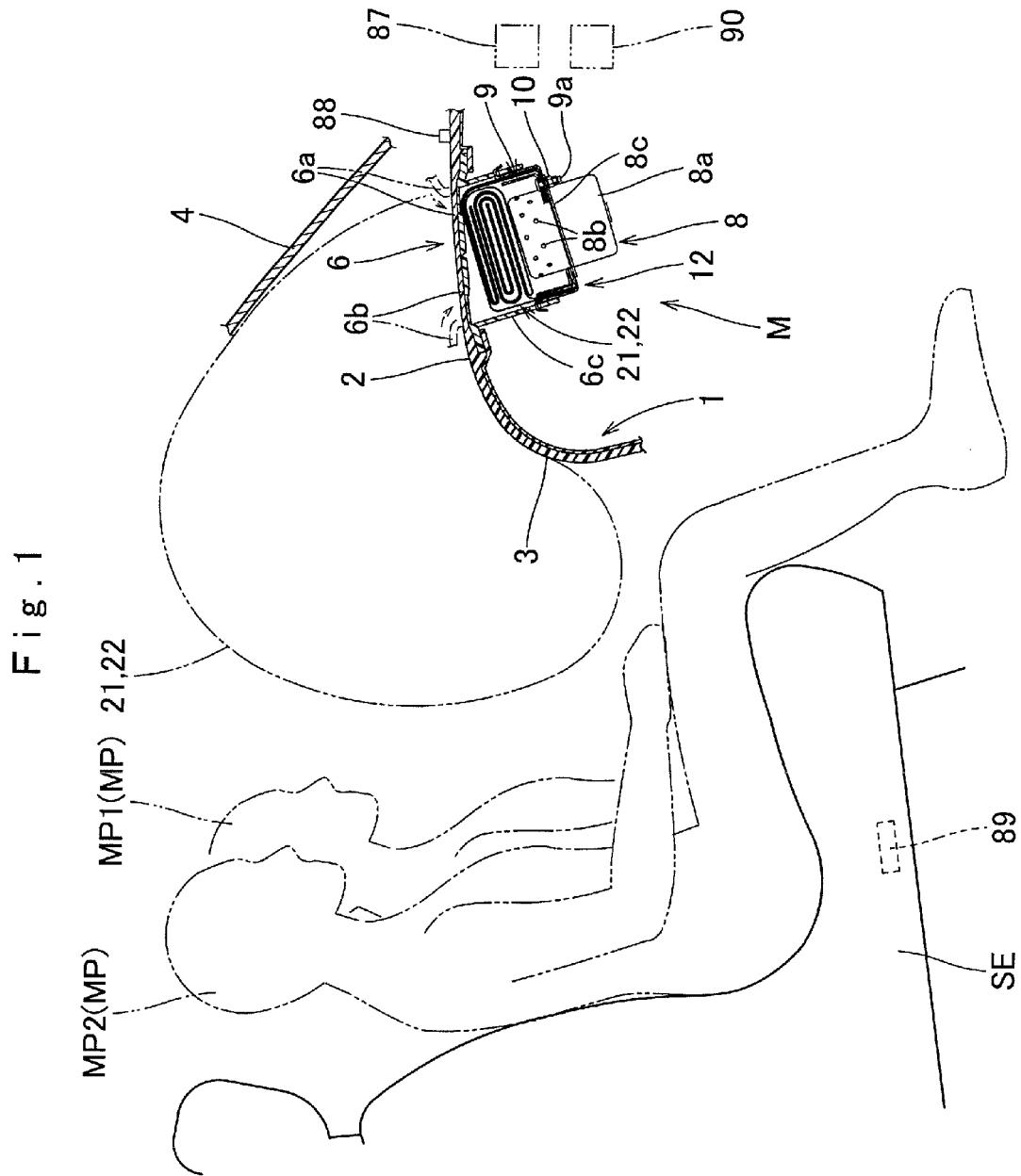
FIG. 1 schematically illustrates an airbag embodying the invention, mounted on a vehicle as part of an airbag apparatus for a front passenger's seat, and its vicinity.

FIG. 1 shows an airbag 21 for a front passenger's seat embodying the present invention, used in an airbag apparatus M for a front passenger's seat. The airbag apparatus M is a top-mount airbag apparatus stored inside a top plane 2 of an instrument panel or dashboard 1, and has various inflation modes of the airbag 21 appropriate to the physical size, seating position and the like of a passenger MP seated in a front passenger's seat SE.

Unless otherwise specified, up/down, front/rear and left/right directions in this specification conform to up/down, front/rear and left/right directions of a vehicle.

Figure 2:
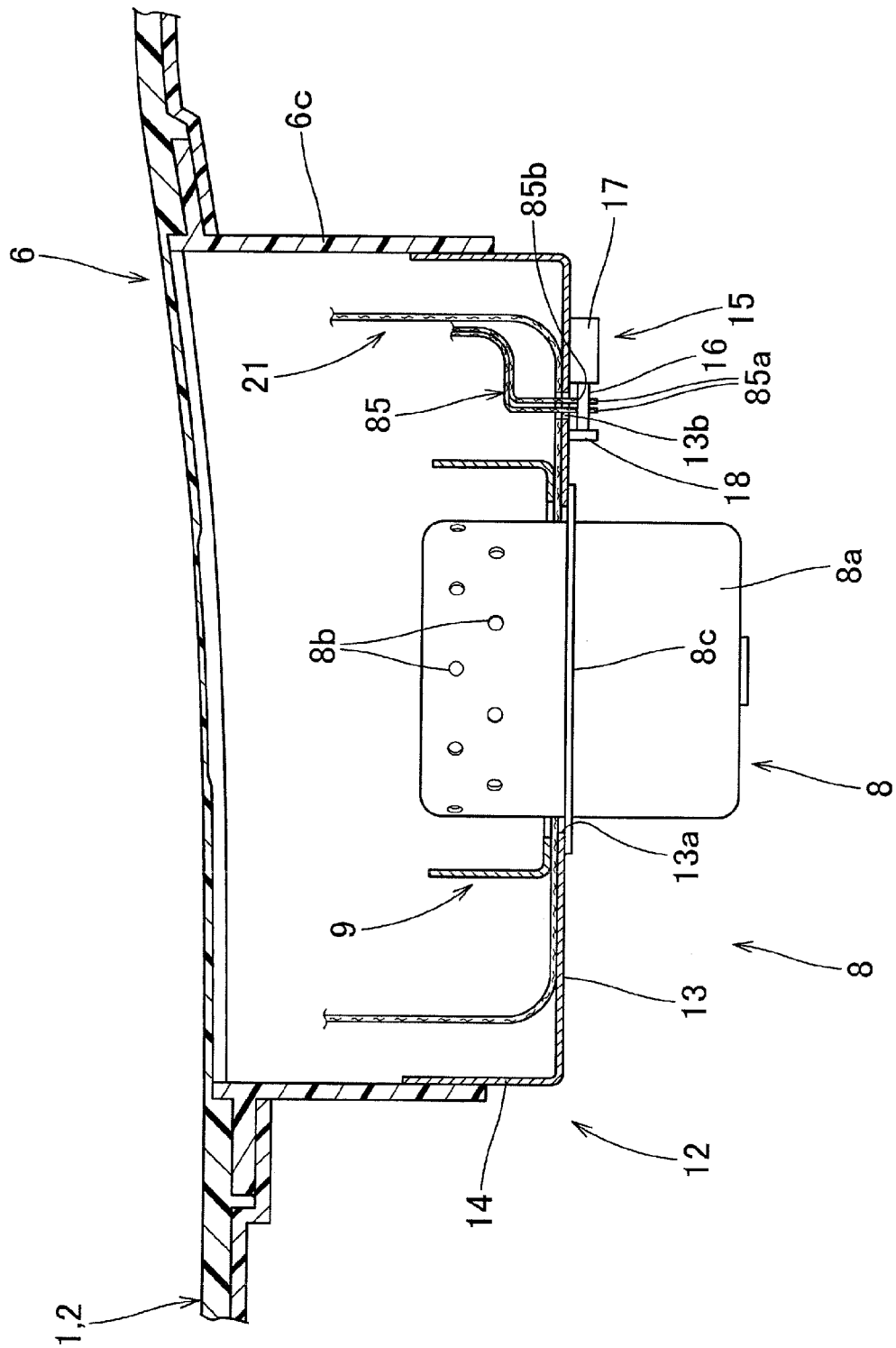
FIG. 2 is a schematic enlarged section of the airbag apparatus of FIG. 1 taken along a left and right direction.

As shown in FIGS. 1 and 2, the airbag apparatus M includes an airbag 21, which is folded up, an inflator 8 for supplying the airbag 21 with an inflation gas, a case 12 for housing and holding the airbag 21 and inflator 8, a retainer 9 for attaching the airbag 21 and inflator 8 to the case 12, an airbag cover 6 for covering the airbag 21, an open/close element 84 that opens and closes a later-described exhaust hole 34 formed on the airbag 21, and a control mechanism that controls open/close operation of the open/close element 84. In this embodiment, the control mechanism is comprised of an anchor structure 15, which anchors a connecting element 85 extending from the open/close element 84 located in the periphery of the exhaust hole 34. Activation of the inflator 8 and anchor structure 15 is controlled by a control device 87 shown in FIG. 1.

As shown in FIG. 1, the control device 87 is electrically communicated with a position sensor 88 for detecting the physical size of a passenger MP seated in a front passenger's seat SE and the distance between the dashboard 1 and the passenger MP, a weight sensor 89 for detecting the weight of the passenger MP, and a collision sensor 90 for detecting the acceleration of a vehicle and direction of acceleration. In response to electric signals fed from these sensors 88, 89 and 90, the control device 87 activates the inflator 8 and controls the operation of the anchor structure 15 in order to inflate the airbag 21 in a preferred inflation mode.

The airbag cover 6 is integral with the dashboard 1 made from synthetic resin and includes two doors, i.e. front and rear doors 6a and 6b adapted to open when pushed by the airbag 21 upon airbag deployment. The airbag cover 6 further includes around the doors 6a and 6b a joint wall 6c, which is coupled to the case 6.

The inflator 8 includes a body portion 8a that is generally columnar in shape and provided with gas discharge ports 8b, and a flange 8c for attachment to the case 12.

The case 12 is made of sheet metal into a generally rectangular parallelepiped shape, and has a generally rectangular opening on top. The case 12 includes a bottom wall 13 of a generally rectangular plate shape and a circumferential wall 14 extending upward from the outer edge of the bottom wall 13. The bottom wall 13 includes an insert hole 13a which the inflator 8 is set in from the lower side and apertures (reference numeral omitted) for receiving bolts 9a of the retainer 9. The circumferential wall 14 retains the joint wall 16c of the airbag cover 16. The bottom wall 13 is further provided, on the left side of the insert hole 13a, a through hole 13b for receiving a later-described leading end portion 85a of the connecting element 85 (FIG. 2).

On the underside of the bottom wall 13 and in a vicinity of the through hole 13b is the anchor structure 15 serving as the control mechanism. The anchor structure 15 anchors the leading end portion 85a of the connecting element 85 extending from the open/close element 84. As shown in FIG. 2, the anchor structure 15 includes an anchor pin 16 to be put through a retaining hole 85b formed at the leading end portion 85a of the connecting element 85 to anchor the leading end portion 85a, an actuator 17 secured to the underside of the bottom wall 13 for retracting the anchor pin 16, and a support bracket 18 that is so formed as to extend downward from the bottom wall 13 at a vicinity of the leading end of the anchor pin 16 for supporting the leading end of the anchor pin 16. If the actuator 17 retracts the pin 16, the anchor pin 16, which had held the leading end portion 85a of the connecting element 85, stops retaining the leading end portion 85a and releases it. The actuator 17 can be any of piston cylinders utilizing fluid pressure such as hydraulic pressure, water pressure, air pressure, or gas pressure which is generated by an inflation gas discharged from the inflator, a motor utilizing such fluid pressure or electricity, an electromagnetic solenoid, a spring which would exert biasing force when restoring, or the like, provided that it can move the anchor pin 16 in response to electric signals fed from the control device 87. When the actuator 17 is not in service, the anchor pin 16 is supported by the support bracket 18 at the leading end so as not to let the leading end portion 85a of the connecting element 85 slip therefrom.

In this specific embodiment, the airbag 21 and the inflator 8 are secured to the case 12 with the retainer 9, which is located inside the airbag 21. Bolts 9a of the retainer 9 are put through a peripheral area of a gas inlet port 29 of the airbag 21, the bottom wall 13 of the case 12 and the flange 8c of the inflator 8, and then fastened into nuts 10. Thus the airbag 21 and the inflator are secured to the case 12.

Referring to FIGS. 3 to 7, the airbag 21 includes a bag body 22, a vertical tether 41 and horizontal tethers 48 that are located inside the bag body 22 for controlling the shape of the bag body 22 as inflated and an open/close element 84 that opens and closes the exhaust hole 34 formed on the bag body 22.

Figure 3:
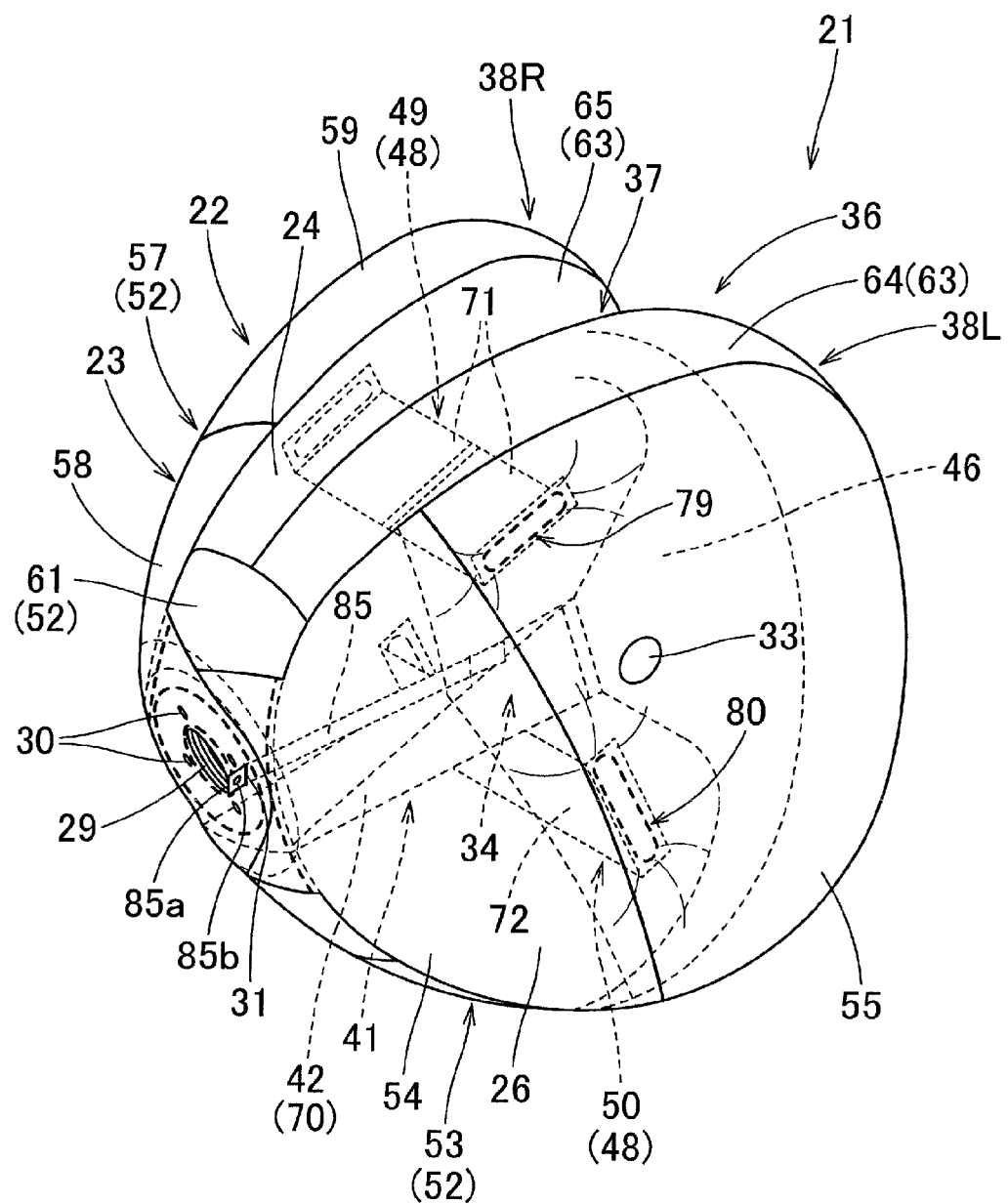
FIG. 3 is a perspective view of the airbag of the embodiment as inflated by itself.
Figure 4:
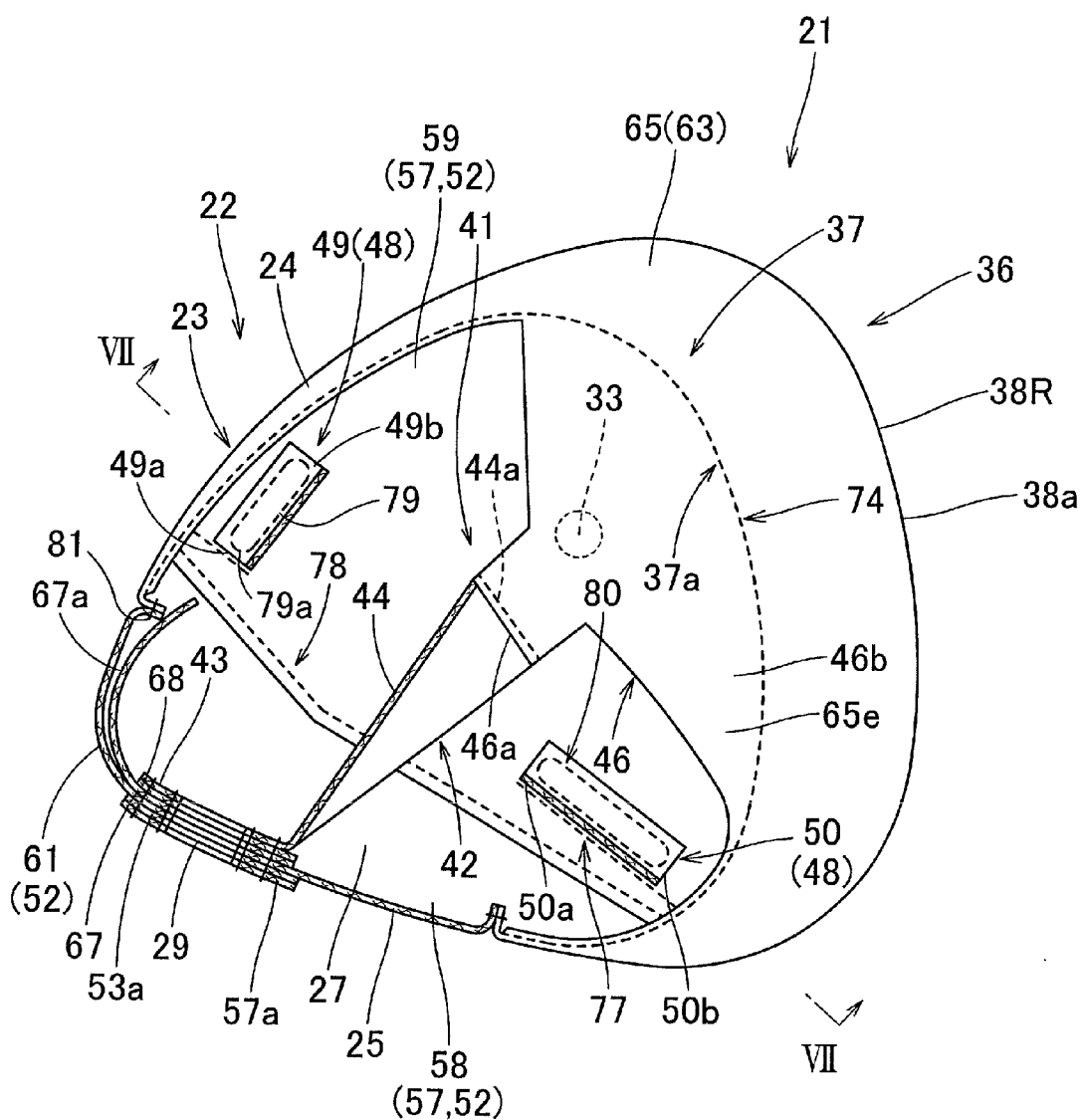
FIG. 4 is a schematic section of the airbag of FIG. 3 taken along a front and rear direction of a vehicle, as viewed from the left.
Figure 15:
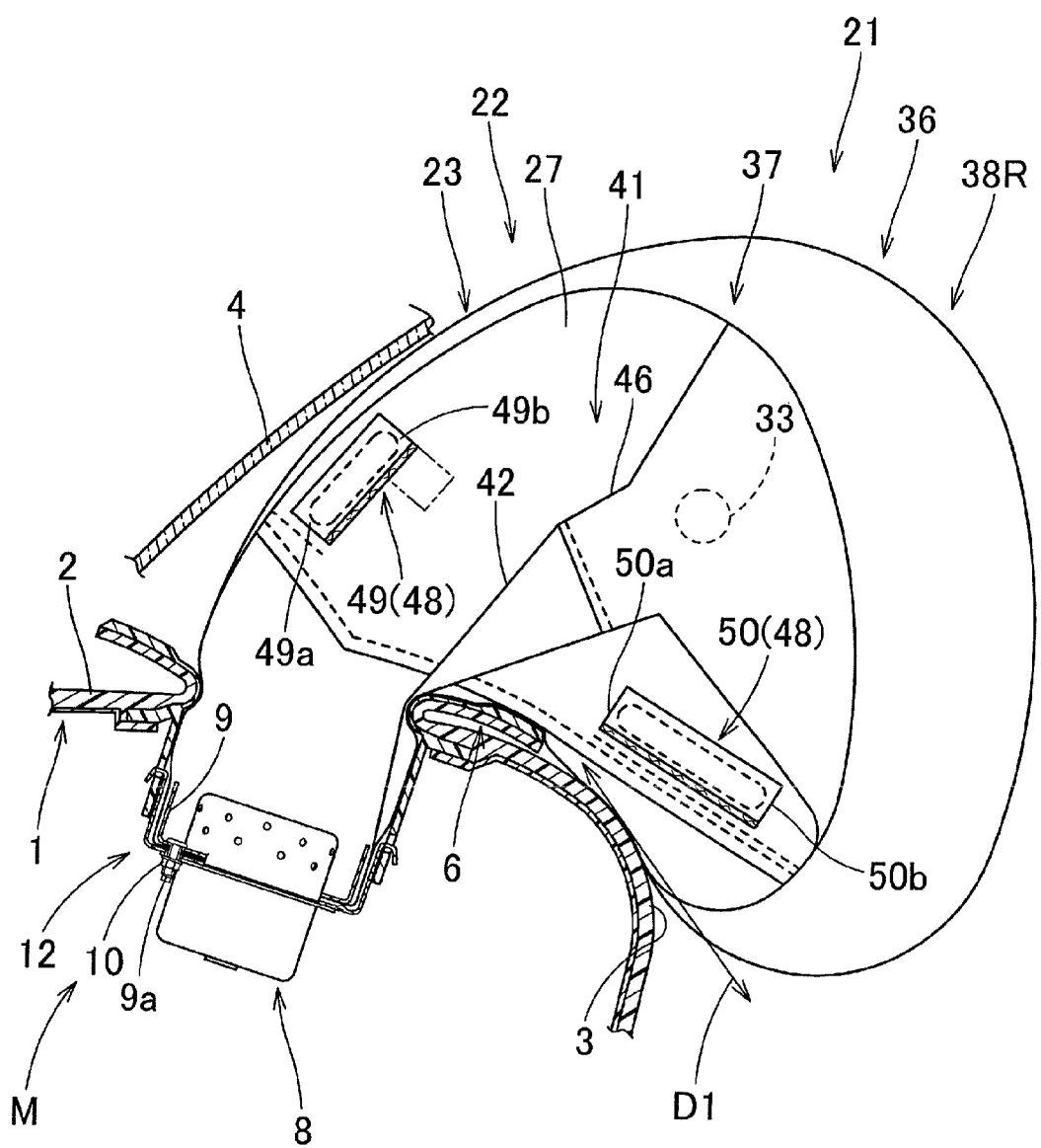
FIG. 15 is a schematic section of the airbag taken along a front and rear direction as the airbag is used in an airbag apparatus for a front passenger's seat.

As shown in FIG. 15, the bag body 22 is designed to inflate into such a bag that fills up a space between the top plane 2 of the dash board 1 and a windshield 4. More specifically, as shown in FIGS. 3 and 4, the bag body 22 is designed to inflate generally into a square cone whose top is at the front end of the bag body 22, and includes a passenger side wall 36 deployable toward a passenger MP and a circumferential wall 23 extending forward from the peripheral edge of the passenger side wall 36 while tapering toward the front end.

Figure 5:
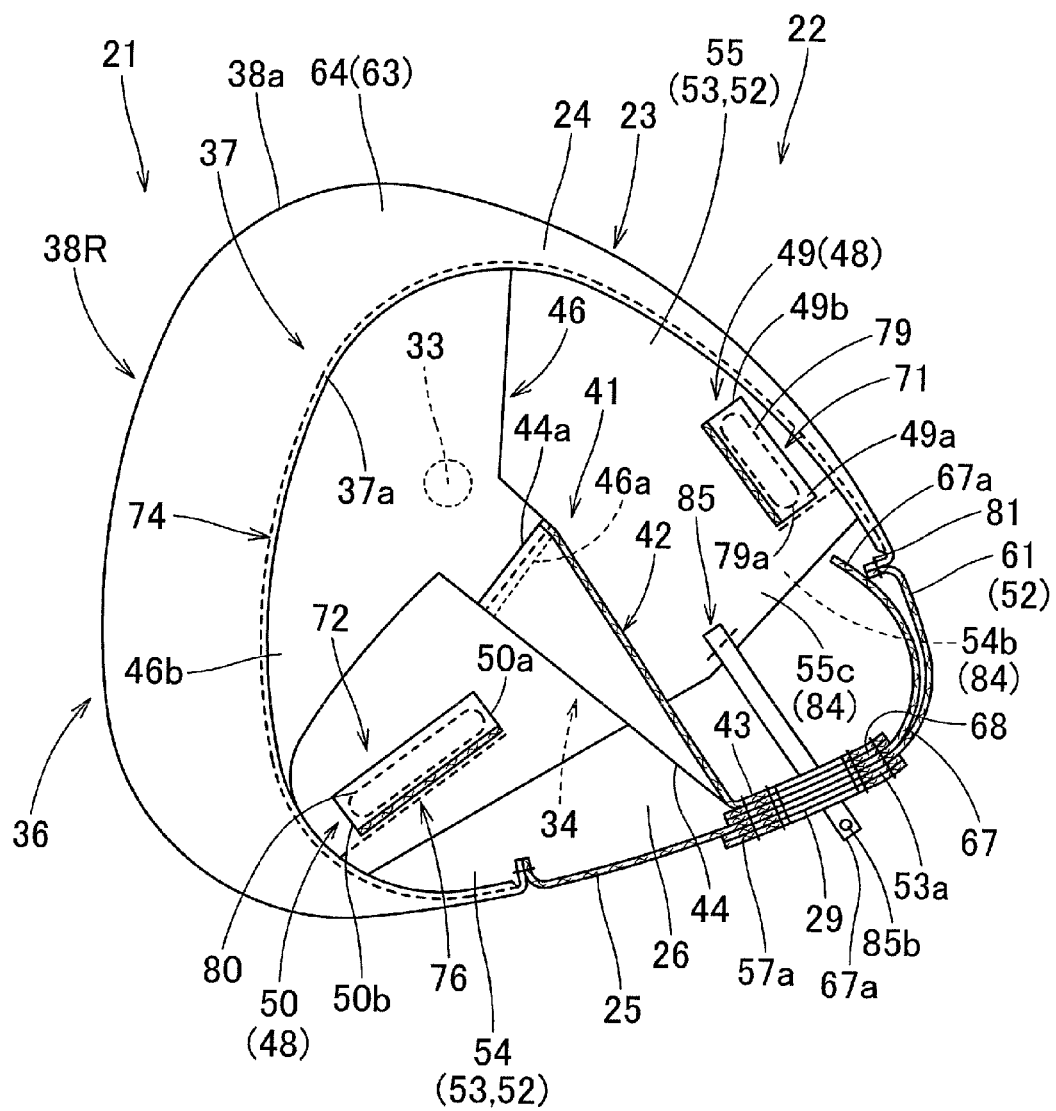
FIG. 5 is a schematic section of the airbag of FIG. 3 taken along a front and rear direction of a vehicle, as viewed from the right.

The circumferential wall 23 is so deployable as to fill up a space between the top plane 2 of the dashboard 1 and the windshield 4, and includes an upper side wall 24 and a lower side wall 25 extending generally along a left and right direction on upper and lower sides and a left side wall 26 and a right side wall 27 extending generally along a front and rear direction on left and right sides. A generally round gas inlet port 29 is formed, for introducing an inflation gas, proximate the front end of and at the center in a left and right direction of the lower side wall 25, which location being proximate the front end of the bag body 22 at full deployment. In the periphery of the inlet port 29 are a plurality of (four, in this embodiment) mounting holes 30 for receiving the bolts 9a of the retainer 9, which mount the periphery of the inlet port 29 on the bottom wall 13 of the case 12. On a left side of the inlet port 29 is a slot 31 for receiving the leading end portion 85a of the connecting element 85 extending from the open/close element 84. Each one generally round vent hole 33 for releasing extra inflation gas is formed respectively on the left side wall 26 and right side wall 27. As shown in FIGS. 4 and 5, in this specific embodiment, each of the vent holes 33 is formed within an area of, and generally at the center in an up and down direction of, later-described left rear panel 55/right rear panel 59 of the left side wall 26/right side wall 27. As shown in FIGS. 3 and 5, the left side wall 26 is further provided with an exhaust hole 34 that is opened and closed by the open/close element 84. As described later, the exhaust hole 34 is formed on a boundary of a left front panel 54 and left rear panel 55, which panels form the left side wall 26. That is, the exhaust hole 34 is located in front of the vent hole 33.

Figure 6:
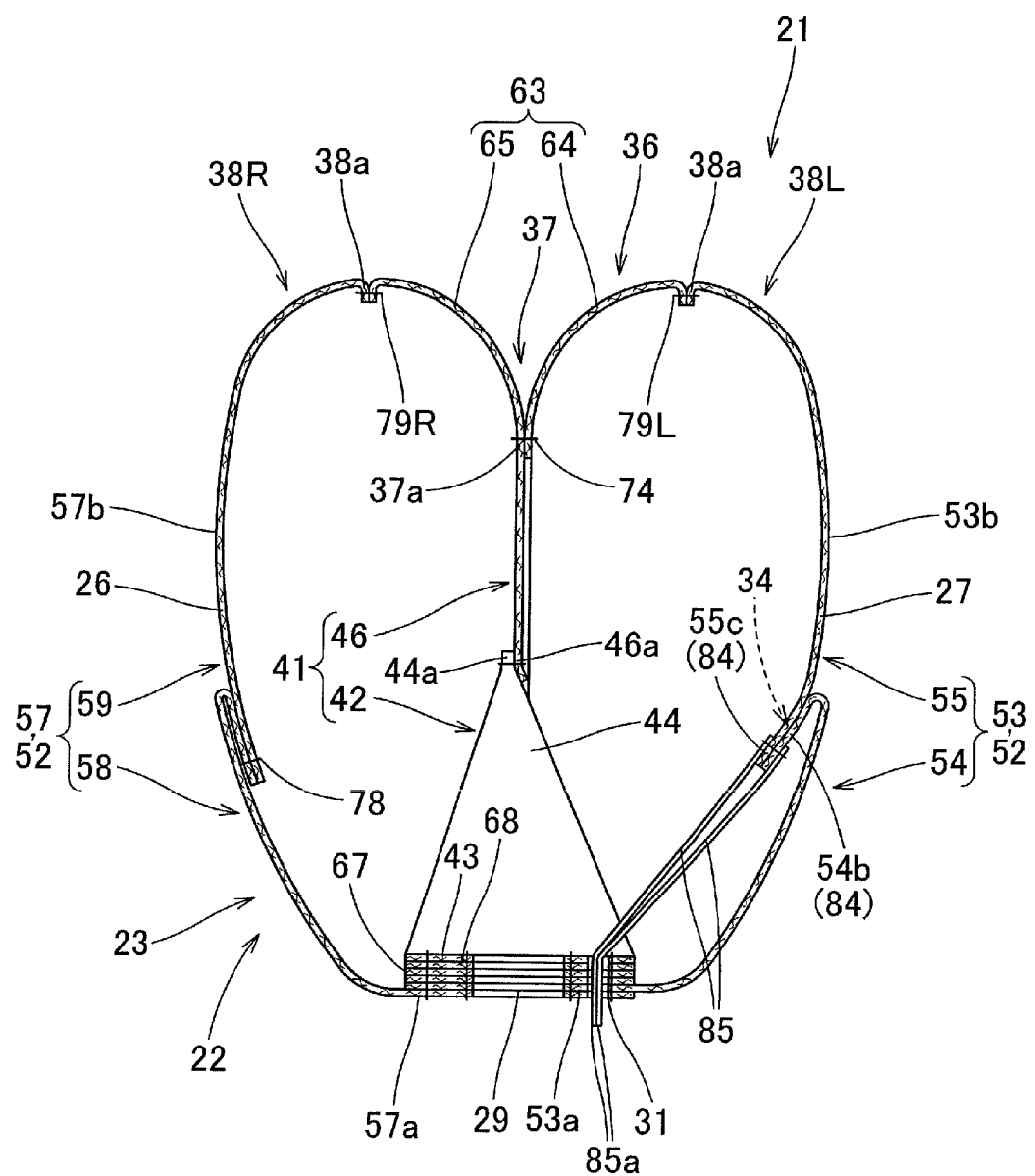
FIG. 6 is a schematic section of the airbag of FIG. 3 generally taken along an up and down direction.

The passenger side wall 36 is deployable generally vertically at the rear end of the bag body 22 in such a manner as to face a passenger MP seated in a front passenger's seat SE. The passenger side wall 36 as inflated includes a recessed area 37 that is sunken forward and extends generally vertically generally at the center in a left and right direction. In this specific embodiment, the recessed area 37 extends over a generally entire area in an up and down direction of the passenger side wall 36. On the left and right sides of the recessed area 36 are raised regions 38L and 38R that protrude rearward relative to the recessed area 37. That is, at full airbag inflation, the recessed area 37, which is sunken at the center in a left and right direction, and the raised regions 38L and 38R, which are located on the left and right sides of the recessed area 37, extend continuously along an up and down direction of the passenger side wall 36 of the bag body 22 (FIGS. 4 to 6). More specifically, in this embodiment, this unevenness created by the recessed area 37 and raised regions 38L and 38R extends uniformly on the passenger side wall 36 and converges toward the gas inlet port 29 on the upper side wall 24 and lower side wall 25 of the circumferential wall 23 (FIGS. 4 and 5). In this embodiment, a seam 74 that sews inner circumferential edges 64b and 65b of a later-described inner left panel 64 and an inner right panel 65 together forms the leading end (or front end 37a) of the recessed area 37 whereas seams 75L and 75R that respectively sew up each of rear edges 55b and 59b of later-described left rear panel 55 and right rear panel 59 and outer circumferential edges 64a and 65a of the inner left panel 64 and inner right panel 65 form tops 38a of the raised regions 38L and 38R.

The vertical tether 41 is made of a flexible sheet material and located inside the bag body 22 in order to pull the front end 37a of the recessed area 37 forward at airbag deployment. More specifically, as shown in FIGS. 4 to 6, the vertical tether 41 of this embodiment includes a front section 42 deployable toward the circumferential wall 23 and a rear section 46 deployable toward the passenger side wall 36.

Figure 8:
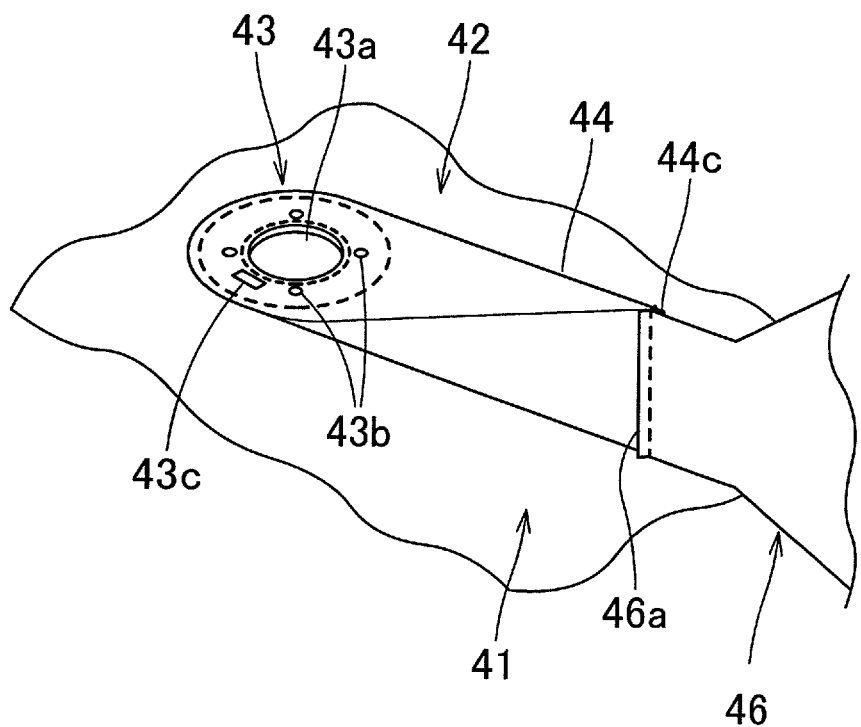
FIG. 8 is a partial enlarged schematic perspective view of a front section of a vertical tether used in the airbag of the embodiment.
Figure 8:
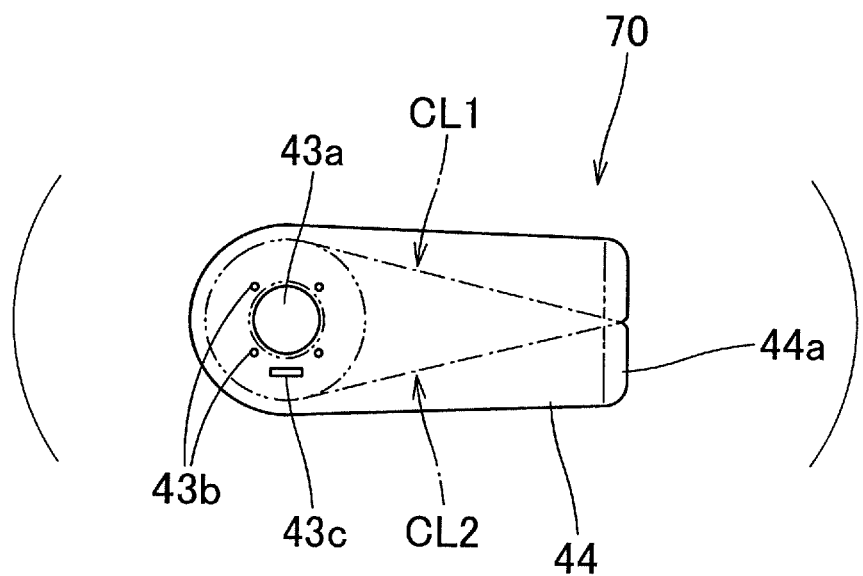

The front section 42 in this embodiment is made by folding up a material 70 for the front section shown in FIG. 8, and is formed into a laterally symmetrical shape relative to the gas inlet port 29. At airbag deployment, it takes such a three-dimensional shape that the front end region extends generally along a left and right direction whereas the rear end region is similar to a generally triangular cone extending generally along an up and down direction (FIG. 8). In this specific embodiment, a front end region of the front section 42 includes openings 43a, 43b and 43c which respectively correspond to the gas inlet port 29, mounting holes 30 and the slot 31 and serves as a joint section 43 to the bag body 22. The joint section 43 is jointed (sewn) to the bag body 22 by an entire circumference (or by an area expanding in a left and right direction) of the gas inlet port 29. A region extending rearward from the gas inlet port 29 is a main body 44 that is similar to a generally triangular cone. More specifically, as shown in FIGS. 4 and 5, the main body 44 opens downward and is closed at the top. The rear end 44a of the main body 44, which is sewn or jointed to the front end 46a of the rear section 46, has such a vertical dimension that generally conforms to the vertical dimension of the front end 46a of the rear section 46.

Figure 9:
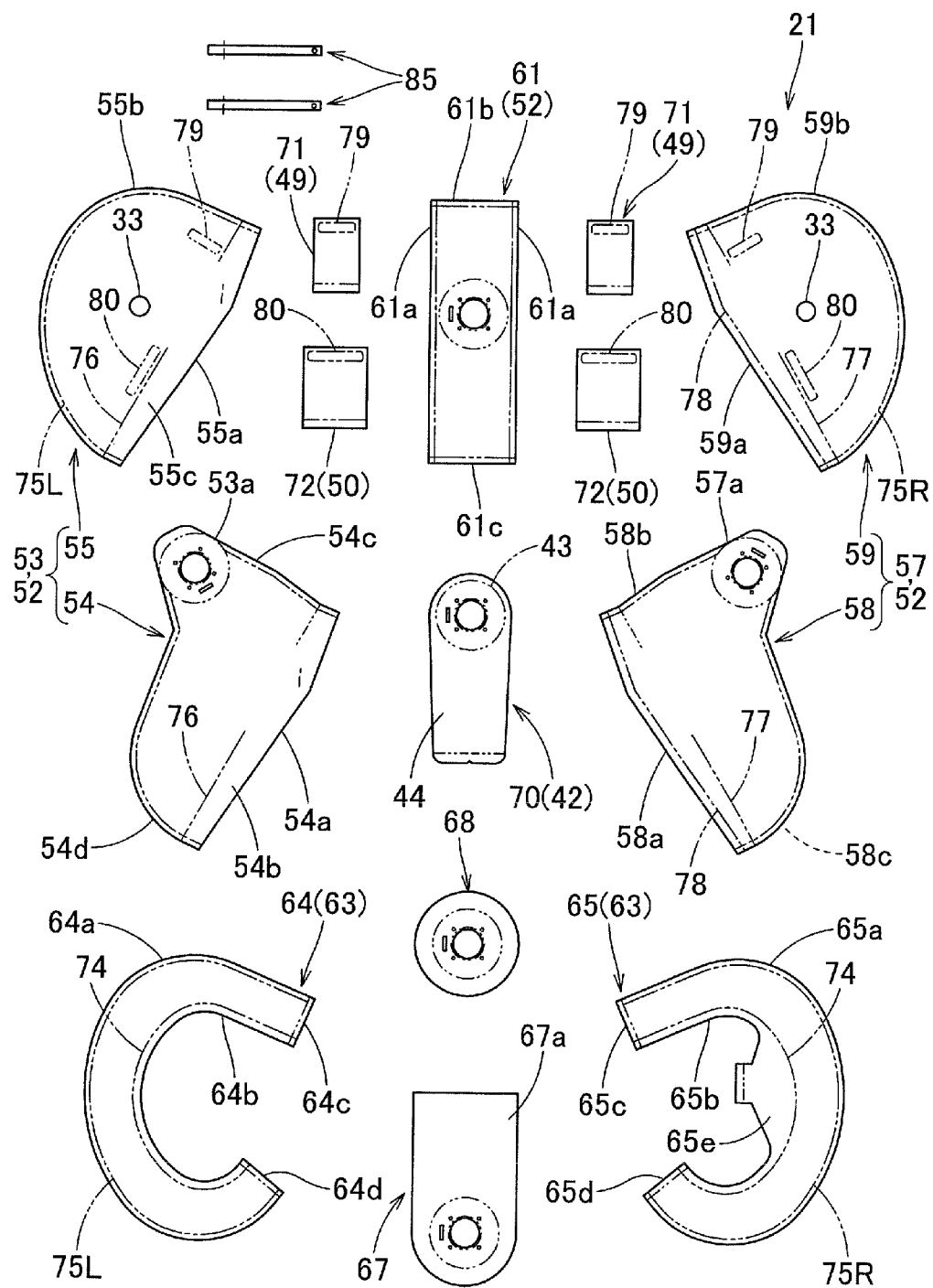
FIG. 9 depicts components of the airbag of the embodiment by plan views.

The rear section 46 is formed into a sheet that extends from an inner circumferential edge 65b of the inner right panel 65 for forming the passenger side wall 36. That is, the rear section 46 is integral with the inner right panel 65, and the rear end 46b is connected with the front end 37a of the recessed area 37 of the passenger side wall 36 (FIG. 9). More specifically, in this specific embodiment, a region of the rear section 46 to be jointed to the front section 42 is formed generally into a band whereas an area toward the rear end 46b is wide and enlarges toward the inner circumferential edge 65b of the inner right panel 65.

Figure 7:
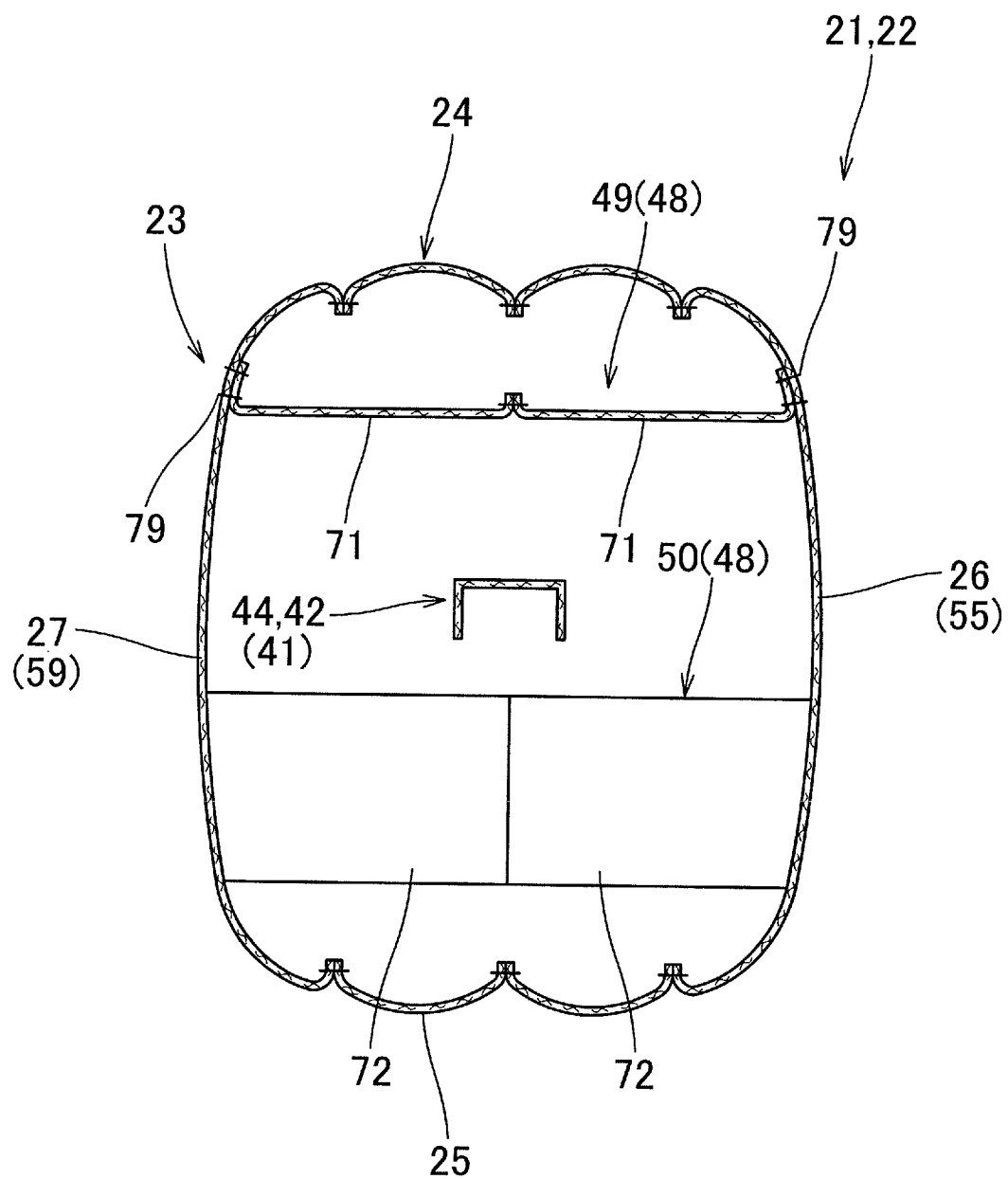
FIG. 7 is an end view taken along line VII-VII in FIG. 4.

As shown in FIGS. 4, 5 and 7, horizontal tethers 48 are located at two locations inside the bag body 22; above and below the vertical tether 41 as the airbag is deployed. Each of the horizontal tethers 48 connects the left side wall 26 and right side wall 27 and extends in a left and right direction at airbag deployment.

Figure 17:
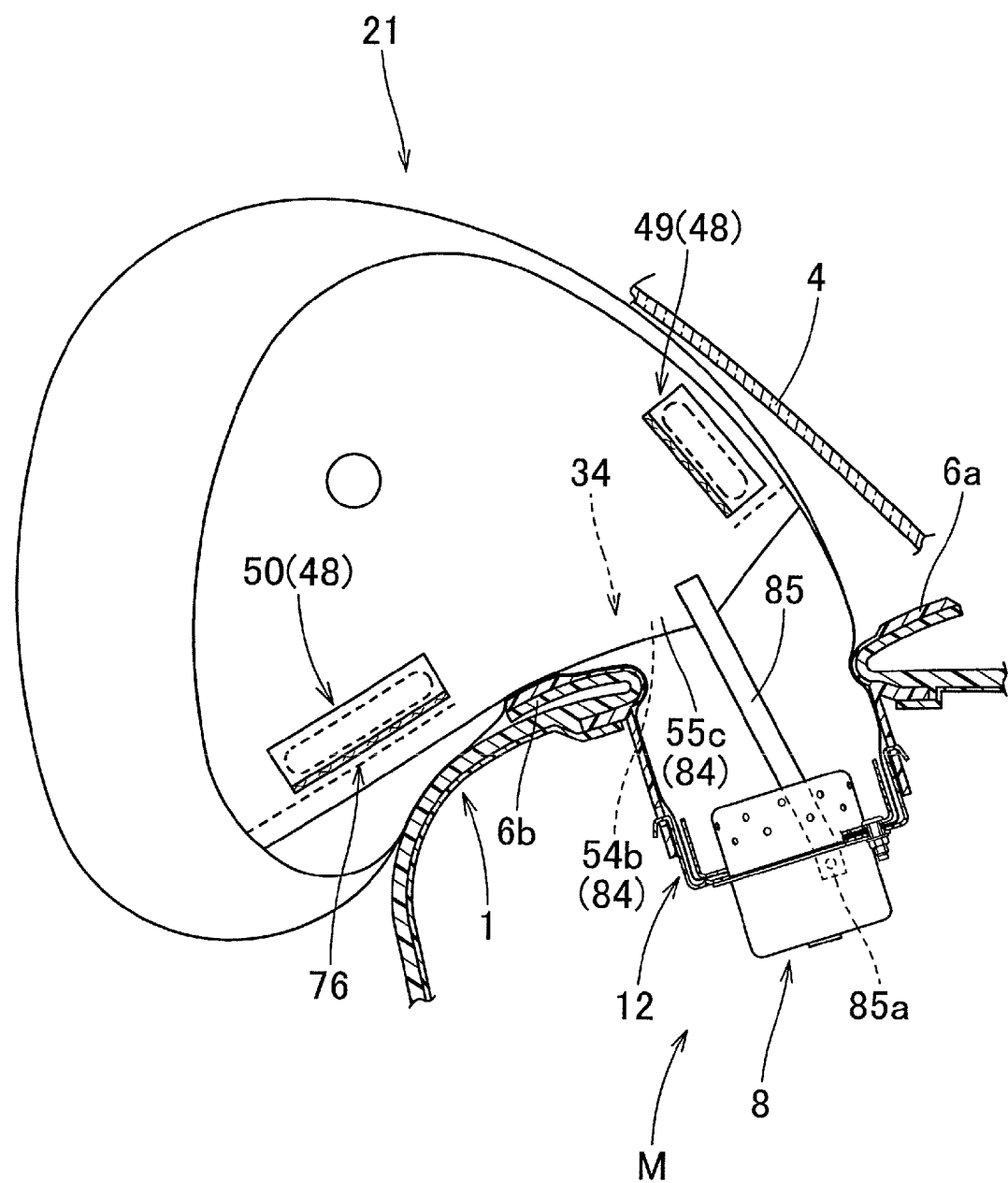
FIG. 17 is a schematic section of the airbag taken along a front and rear direction as the airbag is deployed in a closed mode as part of an airbag apparatus for a front passenger's seat.

One of the horizontal tethers 48 which is deployable above the vertical tether 41, namely an upper horizontal tether 49, is made of a flexible sheet material that is formed generally into a band generally extending in a left and right direction. As shown in FIGS. 4 and 5, at airbag deployment, the upper horizontal tether 49 is so slanted off a front and rear direction that the rear end 49b is located above the front end 49a, as viewed from a side. More particularly, the inclination of the upper horizontal tether 49 relative to a front and rear direction at airbag deployment is such as to be parallel to that of the window shield 4 (FIGS. 15 and 17). As shown in FIG. 7, the upper horizontal tether 49 is comprised of two materials 71. Outer ends of the materials 71 are respectively jointed to the left rear panel 55 and right rear panel 59 that respectively constitute the left side wall 26 and right side wall 27 whereas opposite ends are jointed together, thereby forming the upper horizontal tether 49.

The other horizontal tether 48 which is located below the vertical tether 41, namely the lower horizontal tether 50, is made of a flexible sheet material that is formed generally into a band generally extending in a left and right direction. As shown in FIGS. 4 and 5, at airbag deployment, the lower horizontal tether 50 is so slanted off a front and rear direction that the rear end 50b is located below the front end 50a, as viewed from a side. More particularly, the inclination of the lower horizontal tether 50 relative to a front and rear direction at airbag deployment is such as to be parallel to a tangential direction D1 (FIG. 15) at a generally center of a curve of an area of the rear plane 3 of the dashboard 1 to contact with the bag body 22 at airbag deployment. As shown in FIG. 7, the lower horizontal tether 50 is also comprised of two materials 72. Outer ends of the materials 72 are respectively jointed to the left rear panel 55 and right rear panel 59 that respectively constitute the left side wall 26 and right side wall 27 whereas opposite ends are jointed together, thereby forming the lower horizontal tether 50. In this specific embodiment, the lower horizontal tether 50 is about 1.5 times wider than the upper horizontal tether 49.

As shown in FIGS. 4 and 5, opposite ends of each of the upper horizontal tether 49 and lower horizontal tether 50 of this embodiment are jointed to within areas of the left rear panel 55 and right rear panel 59 that respectively constitute the left side wall 26 and right side wall 27. In other words, the upper horizontal tether 49 and lower horizontal tether 50 are located toward the passenger side wall 36 relative to the exhaust hole 34. More specifically, seams 79 respectively sew or join the upper horizontal tether 49 to the left side wall 26 and right side wall 27. Each front end 79a of the seams 79 are located proximate to a generally straight seams or joint 76 that sews or joins the left front panel 54 and left rear panel 55 in the left side wall 26/a seam 77 that sews the right front panel 58 and right rear panel 59 in the right side wall 27 (FIGS. 4 and 5), and the seams 79 are generally orthogonal to the seams 76 and 77 and extend rear- and upward (FIG. 10B). Seams 80 respectively sew or join the lower horizontal tether 50 to the left side wall 26 and right side wall 27. The seams 80 are located proximate the seams 76 and 77 and extend rear- and downward along the seams 76 and 77 (FIG. 10B). In other words, the seams 79 and 80 are generally orthogonal to each other in a bag body 22 as flattened. Moreover, as shown in FIGS. 4 and 5, each of the seams 79 and 80 is formed generally into a flat oval for prevention of stress concentration.

The exhaust hole 34, which is located on the left side wall 26, is comprised of an unsewn area of the seam or joint 76 that sews or joins the left front panel 54 and left rear panel 55 together to form the left side wall 26. More specifically, the unsewn area of the seam 76, i.e. the exhaust hole 34, ranges from the center to the front region of the seam 76, and its length is about one third of the entire length of the seam 76. When the airbag apparatus M is activated on board, the exhaust hole 34 is to be located in a vicinity of the front end of, and below the center in an up and down direction of the bag body 22 fully deployed (in a vicinity of the top plane 2 of the dashboard 1), as shown in FIGS. 5 and 17. Each of the left front panel 54 and left rear panel 55 includes an extended region 54b/55c that extends inwardly from the seam 76. As shown in FIG. 9, the extended regions 54b/55c are identical in outer contour and entirely unattached to each other at leading end region. In this specific embodiment, the extended regions 54b/55c constitute the open/close element 84 that opens and closes the exhaust hole 34.

Figure 16:
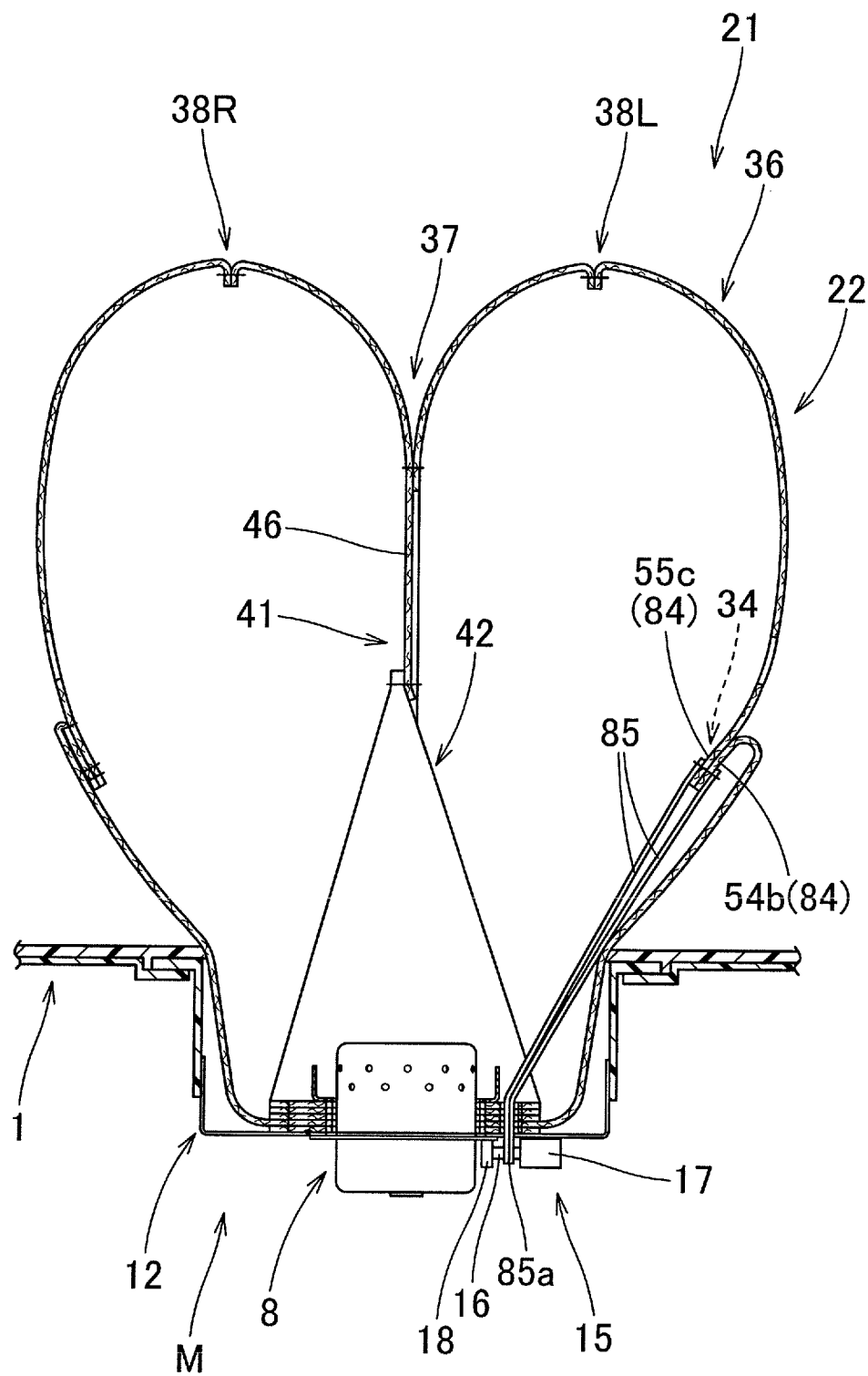
FIG. 16 is a schematic section of the airbag taken along a left and right direction as the airbag is deployed in a closed mode as part of an airbag apparatus for a front passenger's seat.
Figure 18:
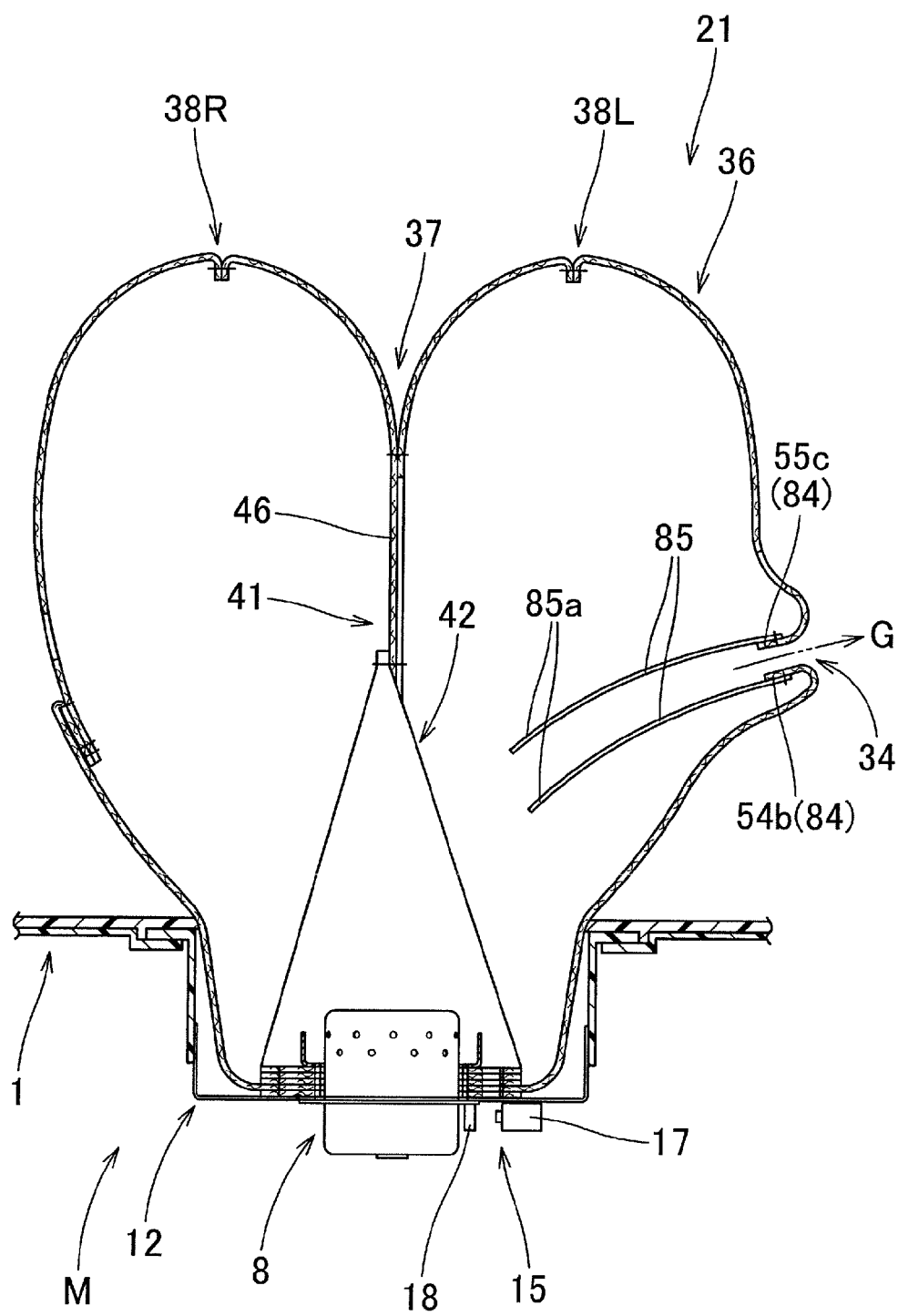
FIG. 18 is a schematic section of the airbag taken along a left and right direction as the airbag is deployed in an open mode as part of an airbag apparatus for a front passenger's seat.
Figure 19:
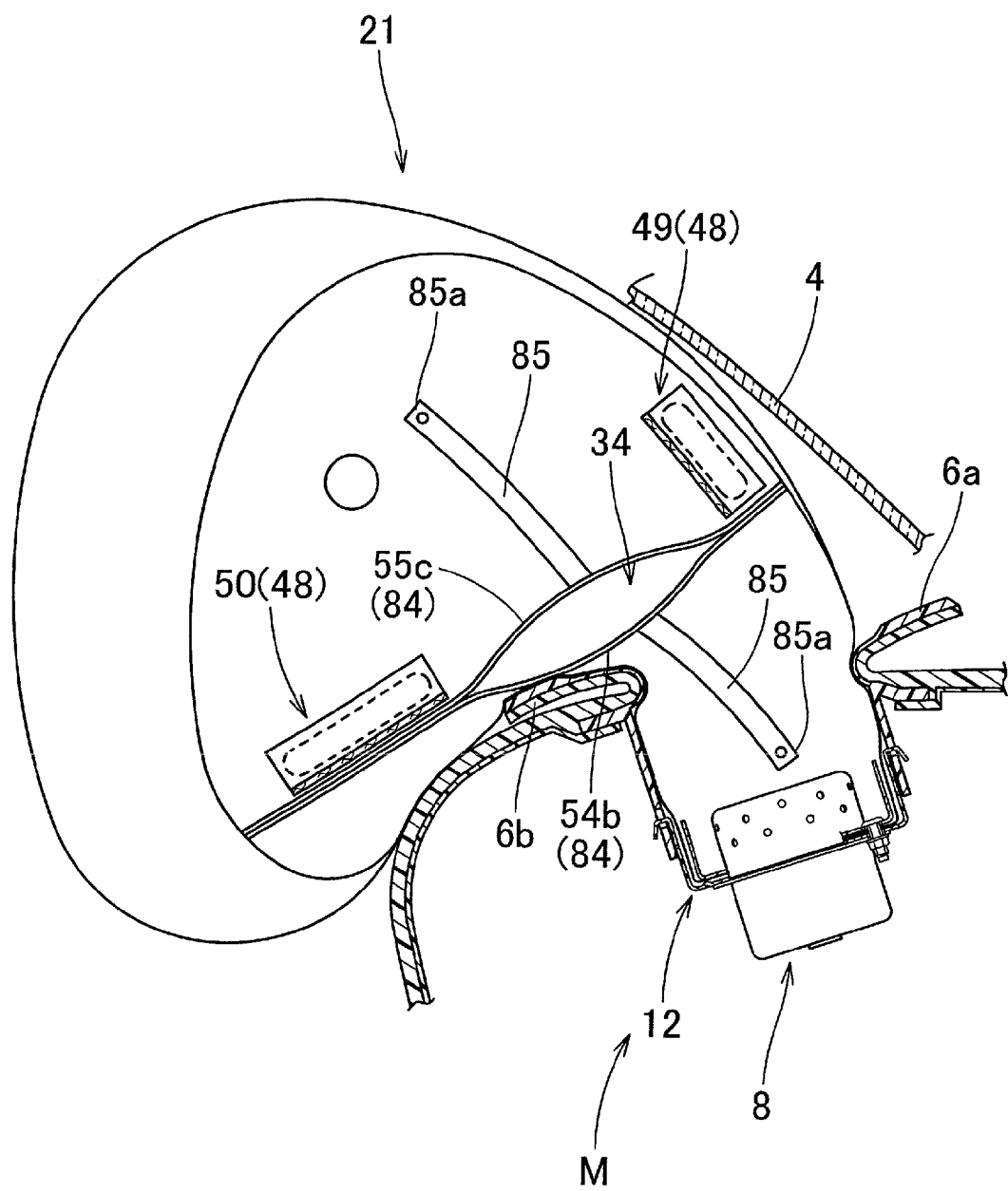
FIG. 19 is a schematic section of the airbag taken along a front and rear direction as the airbag is deployed in an open mode as part of an airbag apparatus for a front passenger's seat.

The connecting element 85, which is to connect the open/close element 84 to the anchor structure 15, is prepared separate from the bag body 22 and is fabricated of a flexible band-shaped cloth. In this specific embodiment, two connecting elements 85 are sewn by the root ends to a vicinity of the exhaust hole 34 in each of the extended regions 54*b*/55*c* (FIGS. 5 and 6). Each of the connecting elements 85 includes at the leading end portion 85*a* a retaining hole 85*b* for receiving the anchor pin 16 of the anchor structure 15. The length of each of the connecting elements 85 is so designed as to allow the bag body 22 to inflate fully smoothly even when the bag body 22 inflates in a closed mode where the connecting elements 85 are anchored by the anchor structure 15 and draw the open/close element 84 into the bag body 22. In the airbag apparatus M, when the airbag 21 inflates in a closed mode where the connecting elements 85 are anchored by the anchor structure 15, the connecting elements 85 draw the extended regions 54*b*/55*c* inward. Therefore the extended regions 54*b*/55*c* are pressed against each other due to an internal pressure of an inflation gas fed to the bag body 22, such that the exhaust hole 34 is closed (FIGS. 16 and 17). When the airbag 21 inflates in an open mode where the connecting elements 85 are released from the anchor structure 15, the extended regions 54*b*/55*c* are separated from each other as the bag body 22 inflates, such that the exhaust hole 34 opens (FIGS. 18 and 19).

The bag body 22 is formed by sewing together circumferential edges of predetermined shaped base cloths. As shown in FIG. 9, the bag body 22 of this specific embodiment is comprised of circumferential panels 52, which mainly constitute the circumferential wall 23, and passenger-side panels 63, which mainly constitute the passenger side wall 36. The circumferential panels 52 include a left side panel 53 for forming mainly the left side wall 26, a right side panel 57 for forming the right side wall 27, and a front side panel 61 for forming a region from the front area of the upper side wall 24 to the front area of the lower side wall 25. The passenger-side panels 63 include an inner left panel 64 and an inner right panel 65, which constitute mainly the passenger side wall 36 together.

Figure 10A:
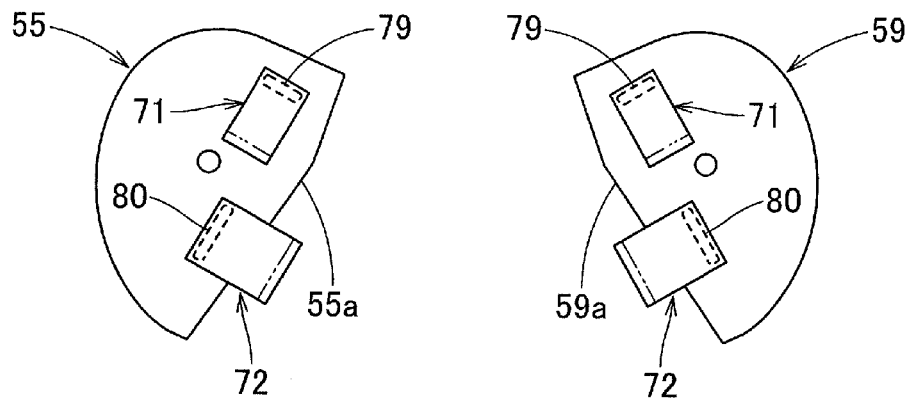
FIGS. 10A, 10B, 10C, 11A, 11B, 11C, 12A, 12B and 12C schematically illustrate the process of manufacturing the airbag of the embodiment.
Figure 10B:
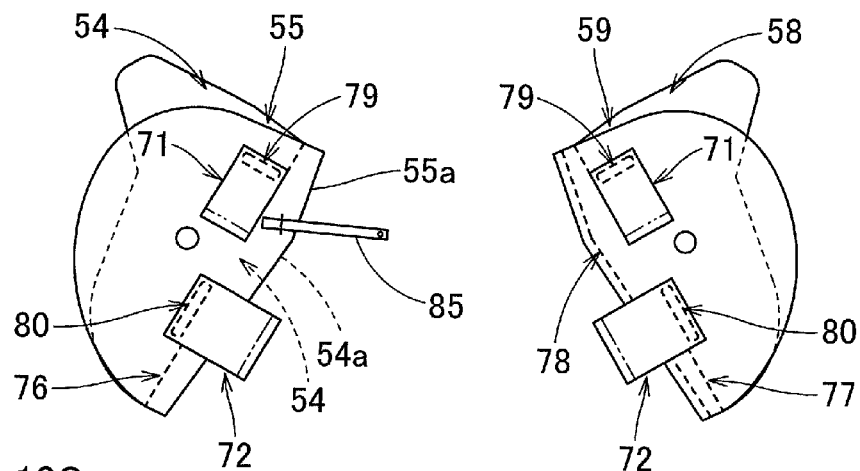
Figure 10C:
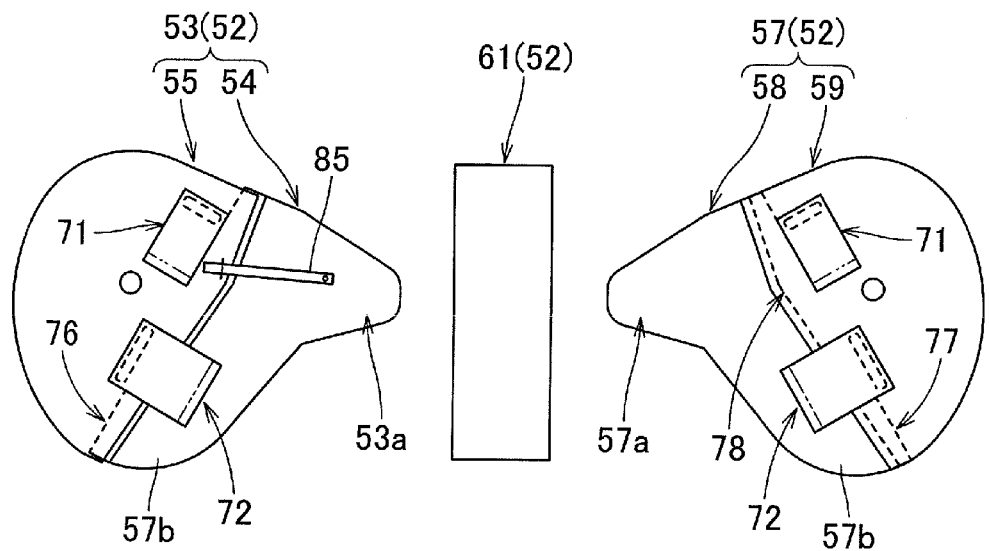

As shown in FIG. 10C, the left side panel 53 and the right side panel 57 are formed into laterally symmetric, generally sectorial contour, and respectively include a root side section 53*a*/57*a*, which constitutes the peripheral area of the gas inlet port 29, and a leading end section 53*b*/57*b*, which extend from the root side section 53*a*/57*a* in a flaring fashion. Each of the leading end section 53*b*/57*b* forms a region ranging from the left side wall 26/right side wall 27 to the top 38*a* of the raised region 38L/38R in the passenger side wall 36. In this specific embodiment, each of the left side panel 53 and the right side panel 57 is comprised of two panels split into front and rear in the leading end region 53*b*/57*b*; the left side panel 53 is comprised of the left front panel 54 and left rear panel 55 whereas the right side panel 57 is comprised of the right front panel 58 and right rear panel 59. The left front panel 54 and right front panel 58, and the left rear panel 55 and right rear panel 59, are respectively laterally symmetric.

The rear edge 54*a* of the left front panel 54 and the front edge 55*a* of the left rear panel 55 are identical in outer contour, and the rear edge 54*a* and front edge 55*b* are laid one over the other and sewn together with sewing threads, thereby forming the left side panel 53. The seam 76, which sews together the panels 54 and 55, are formed generally straightly along a line located slightly away from the rear edge 54*a* and front edge 55*b*, through an entire area in a front and rear direction except the unsewn area for forming the exhaust hole 34. The regions in the left front panel 54 and left rear panel 55 located inside of the seam 76 are the extended regions 54*b* and 55*b* and serve as the open/close element 84. In the same fashion as the left side panel 53, the rear edge 58*a* of the right front panel 58 and the front edge 59*a* of the right rear panel 59, which are identical in outer contour, are overlaid one over the other and sewn together by a seam 77, thereby forming the right side panel 57. The seam 77 includes an unsewn area in a similar fashion to the seam 76 in the left side panel 53. The right front panel 58 and right rear panel 59 are sewn together with a further seam 78 that joins the rear edge 58*a* and front edge 59*a* thoroughly, and accordingly closes off the unsewn area of the seam 77 (FIG. 4).

The front side panel 61 is formed into a generally band shape, and forms a region in the circumferential wall 23 ranging from the front area of the upper side wall 24 to the front area of the lower side wall 25 including the peripheral area of the gas inlet port 29.

The inner left panel 64 and inner right panel 65 constitute a region of the passenger side wall 36 between the tops 38*a* of the raised regions 38L and 38R. More specifically, the panels 64 and 65 form a region of the bag body 22 ranging from the rear side of the upper side wall 24 in the circumferential wall 23 to the rear side of the lower side wall 25 via an area of the passenger side wall 36 between the tops 38*a* of the raised regions 38L and 38R. The inner left panel 64 and inner right panel 65 are configured into a pair of bands each curving generally in a C-shape such that each panel 64/65 forms the left/right half of the above-described region split up at the leading end or front end 37*a* of the recessed area 37. That is, the inner left panel 64 constitutes a region from the front end 37*a* of the recessed area 37 to the top 38*a* of the left raised region 38L whereas the inner right panel 65 constitutes a region from the front end 37*a* of the recessed area 37 to the top 38*a* of the right raised region 38R. In other words, each of the panels 64 and 65 has a generally band shape curving rearward at the outer circumferential edge 64*a*/65*a* and inner circumferential edge 64*b*/65*b*. In this specific embodiment, the inner right panel 65 is provided at the inner circumferential edge 65*b* with an extended region 65*e* that forms the rear section 46 of the vertical tether 41. Moreover, the outer circumferential edges 64*a* and 65*a* of the inner left panel 64 and inner right panel 65 are designed identical in curved shape to the rear edges 55*b* and 59*b* of the left rear panel 55 and right rear panel 59.

The bag body 22 further includes two reinforcing cloths 67 and 68 for reinforcing the peripheral area of the gas inlet port 29. As shown in FIGS. 4 and 5, the reinforcing cloth 67 is placed over the periphery of the gas inlet port 29 inside the bag body 22, and includes an extended region 67*a* that extends forward from the gas inlet port 29. The extended region 67*a* covers a later-described seam 81 on the inner side at airbag deployment and prevents an inflation gas fed from the gas inlet port 29 from hitting the seam 81 directly. As shown in FIG. 9, the reinforcing cloth 68 is generally annular in shape and placed over the reinforcing cloth 67 for reinforcing the periphery of the gas inlet port 29.

In this embodiment, the left side panel 53 (i.e., the left front panel 54 and left rear panel 55), right side panel 57 (i.e., the right front panel 58 and right rear panel 59), front side panel 61, inner left panel 64, inner right panel 65, reinforcing cloths 67 and 68, material 70 to form the front section 42 of the vertical tether 41, materials 71 to form the upper horizontal tether 49, materials 72 to form the lower horizontal tether 50 are made of flexible woven fabric of polyester yarn, polyamide yarn or the like. Materials of the bag body 22, vertical tether 41, horizontal tethers 48 (i.e., the upper horizontal tether 49 and lower horizontal tether 50) are not coated with such coating agents as silicone.

Figure 11A:
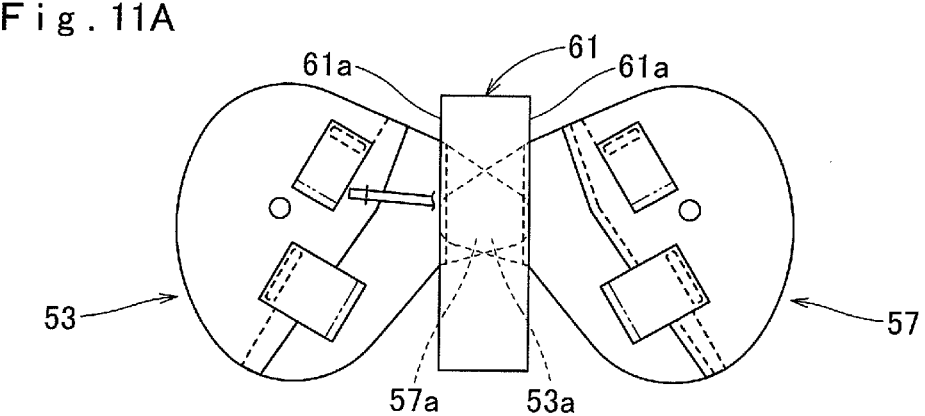
Figure 11B:
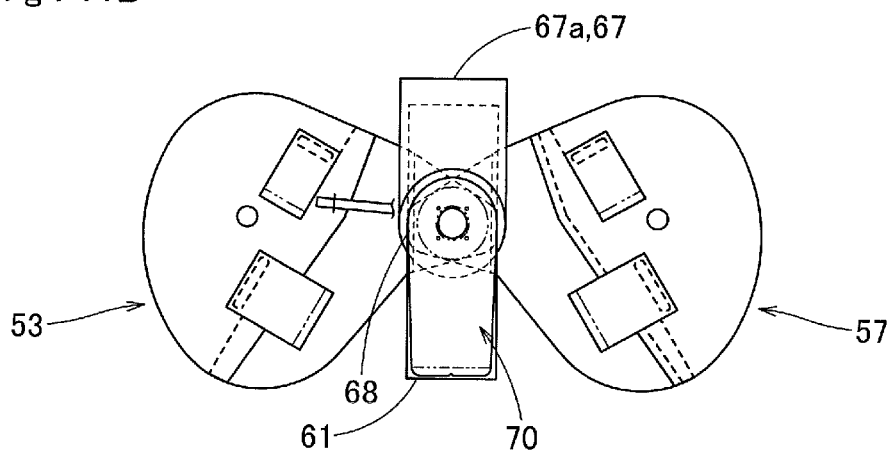
Figure 11C:
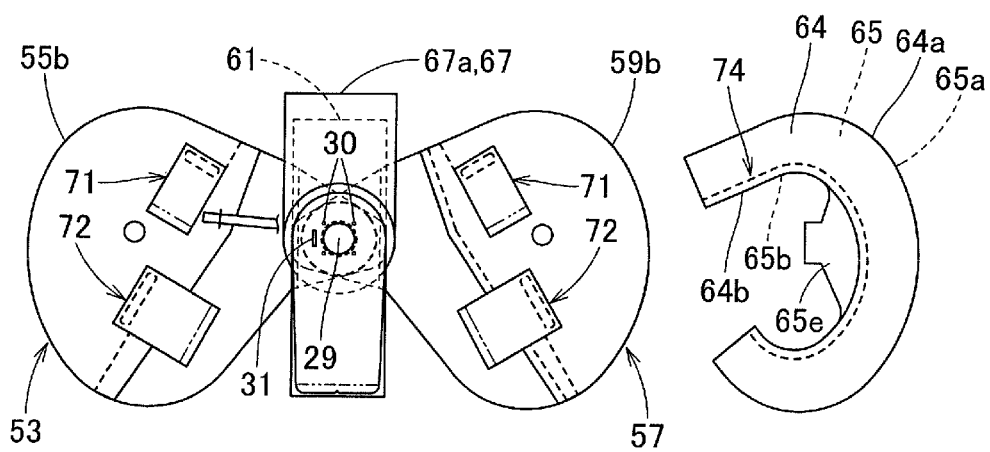

Manufacturing of the airbag 21 is now described. In advance, as shown in FIG. 11C, the inner left panel 64 and inner right panel 65 are overlaid one above the other with the outer circumferential edges 64*a* and 65*a* aligned, and the inner circumferential edges 64*b* and 65*b* are sewn together with sewing threads, thereby forming the seam 74.

Firstly, as shown in FIG. 10A, first ends of the materials 71 and 72 for the upper and lower horizontal tethers 49 and 50 are sewn with sewing threads to the left rear panel 55 and right rear panel 59, respectively, thereby forming the seams 79 and 80. Then as shown in FIG. 10B, the left rear panel 55 and left front panel 54 are sewn together by the seam 76, thus the left side panel 53 and the exhaust hole 34 are formed. At this time, the root ends of the connecting elements 85 are sewn to the extended regions 54*b* and 55*c* of the left front panel 54 and left rear panel 55. Likewise, the right rear panel 59 and right front panel 58 are sewn together by the seams 77 and 78, thereby forming the right side panel 57.

Subsequently, as shown in FIG. 10C, the left side panel 53 and right side panel 57 are opened about the seam 76/77, respectively, and the root side sections 53*a* and 57*a* are overlaid one above the other. The front side panel 61 is further laid over there. Then as shown in FIG. 11A, the root side sections 53*a* and 57*a* of the left side panel 53 and right side panel 57 and the front side panel 61 are sewn together with sewing threads at vicinities of the left and right edges 61*a* of the front side panel 61 in a region overlapping with the root side sections 53*a* and 57*a*. Then the reinforcing cloths 67, 68 and the material 70 for the front section 42 are placed over the front side panel 61 in order (FIG. 11B), and all these cloth members are sewn together with sewing threads at the periphery of the gas inlet port 29. Thereafter the gas inlet port 29, mounting holes 30 and the slot 31 are punched out as shown in FIG. 11C.

Figure 12A:
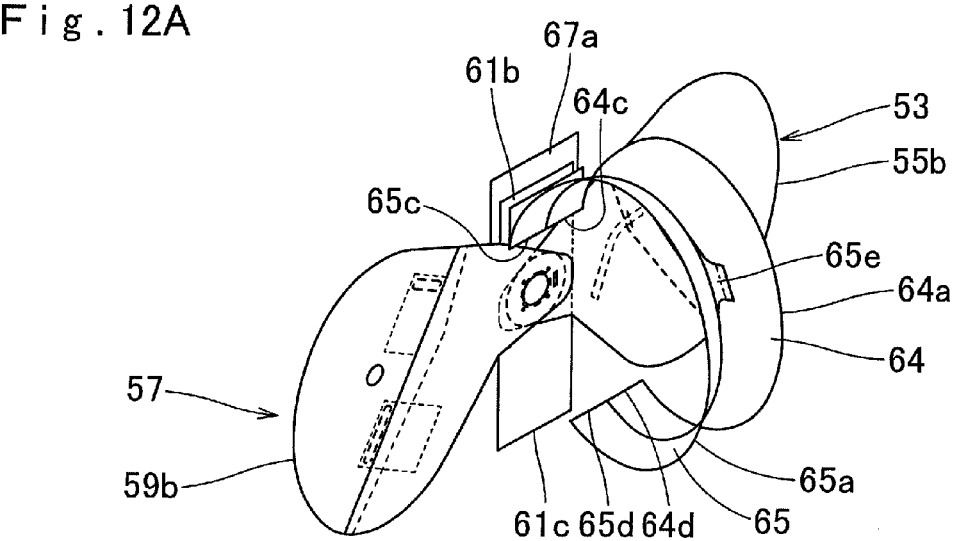
Figure 12B:
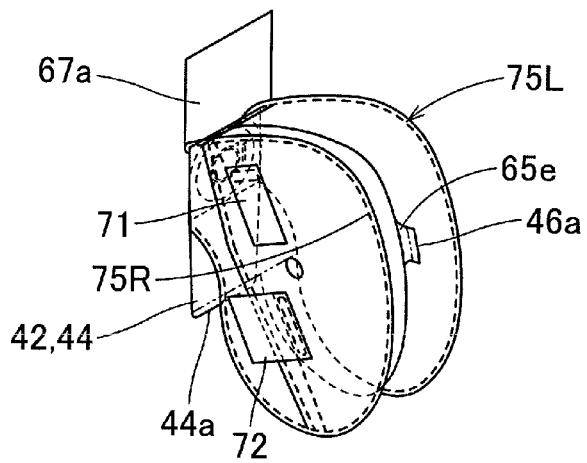

Then as shown in FIG. 12A, the inner left panel 64 and inner right panel 65 are opened in such a manner as to separate the front edges 64*c* and 65*c* away from each other, and the front edges 64*c* and 65*c* are sewn to the front edge 61*b* of the front side panel 61 with sewing threads, thereby forming the seam 81. Likewise, the rear edges 64*d* and 65*d* of the panels 64 and 65 as opened are sewn to the rear edge 61*c* of the front side panel 61. Subsequently, upper regions of the left and right edges 61*a* of the front side panel 61 are respectively sewn to upper edges 54*c* and 58*b* of the left front panel 54 and right front panel 58 with sewing threads, whereas lower regions of the left and right edges 61*a* of the front side panel 61 are respectively sewn to lower edges 54*d* and 58*c* of the left front panel 54 and right front panel 58. Then the outer circumferential edge 64*a* of the inner left panel 64 and the rear edge 55*b* of the left rear panel 55 are sewn together with sewing threads, thus forming the seam 75L, whereas the outer circumferential edge 65*a* of the inner right panel 65 and the rear edge 59*b* of the right rear panel 59 are sewn together, thus forming the seam 75R (FIG. 12B).

Figure 12C:
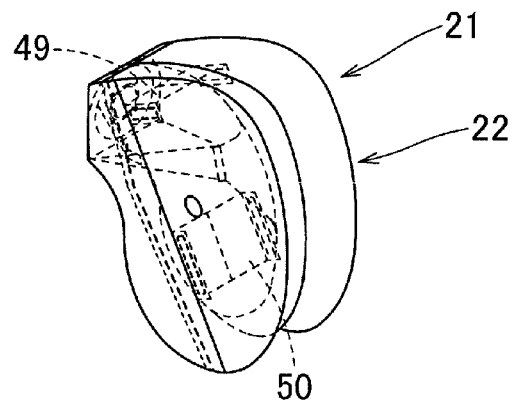

Thereafter, as shown in FIG. 8, the material 70 for the front section 42 is folded on creases CL1 and CL2 to form the main body 44, and the rear edge 44*a* as is doubled is sewn to the front edge 46*a* of the rear section 46, which is comprised of the extended region 65*e* of the inner right panel 65, with sewing threads, thus forming the vertical tether 41. Subsequently, second ends of the materials 71 for the upper horizontal tether as well as second ends of the materials 72 for the lower horizontal tether are respectively sewn together with sewing threads, thereby forming the upper horizontal tether 49 and lower horizontal tether 50. If then the bag body 22 is reversed inside out from the gas inlet port 29 such that seam allowances may not appear outside, the airbag 21 is completed as shown in FIG. 12C.

When the airbag 21 is completed, the retainer 9 is housed inside the airbag 21 such that the bolts 9*a* project out of the mounting holes 30, and then the airbag 21 is folded up. The airbag 21 is then wrapped up by a tearable wrapping sheet (reference numeral omitted) for keeping the folded-up configuration. At this time, leading end regions 85*a* of the connecting elements 85 extending from the open/close element 84 are taken out of the slot 31 of the bag body 22. Then the airbag 21 is set in the case 12 having the anchor structure 15 such that the bolts 9*a* protrude out of the apertures of the bottom wall 13. Subsequently, the anchor pin 16 of the anchor structure 15 is put through the retaining holes 85*b* of the connecting elements 85 projecting out of the through hole 13*b* formed on the bottom wall 13, and then the leading end of the anchor pin 16 is made supported by the support bracket 18. Thus the leading ends 85*a* of the connecting elements 85 are anchored by the anchor structure 15. Then the bolts 9*a* projecting downwardly from the bottom wall 13 are put through the flange 8*c* of the inflator 8 and fastened with nuts 10. Thus the airbag 21 and the inflator 8 are mounted on the case 12.

Thereafter, the circumferential wall 14 of the case 12 is attached to the joint wall 6*c* of the airbag cover 6 on the dashboard 1 having been mounted on vehicle, unillustrated brackets of the case 12 are secured to the vehicle body structure, and the inflator 8 and the anchor structure 15 are electrically connected with the control device 87. Thus the airbag apparatus M is mounted on a vehicle.

After mounting the airbag apparatus M on a vehicle, in the event of collision of the vehicle, the control device 87 feeds actuating signals to the inflator 8 so that an inflation gas G is discharged from the gas discharge ports 8*b* of the inflator 8 to inflate the airbag 21. Then the airbag 21 pushes and opens the doors 6*a* and 6*b* of the airbag cover 6 as shown in FIG. 15. Then the airbag 21 protrudes upward from an opening formed by the opening of the doors 6*a* and 6*b*, and deploys rearward in such a manner as to fill in a space between the top plane 2 of the dashboard 1 and windshield 4 as shown in FIGS. 1, 15 and 16.

Figure 13:
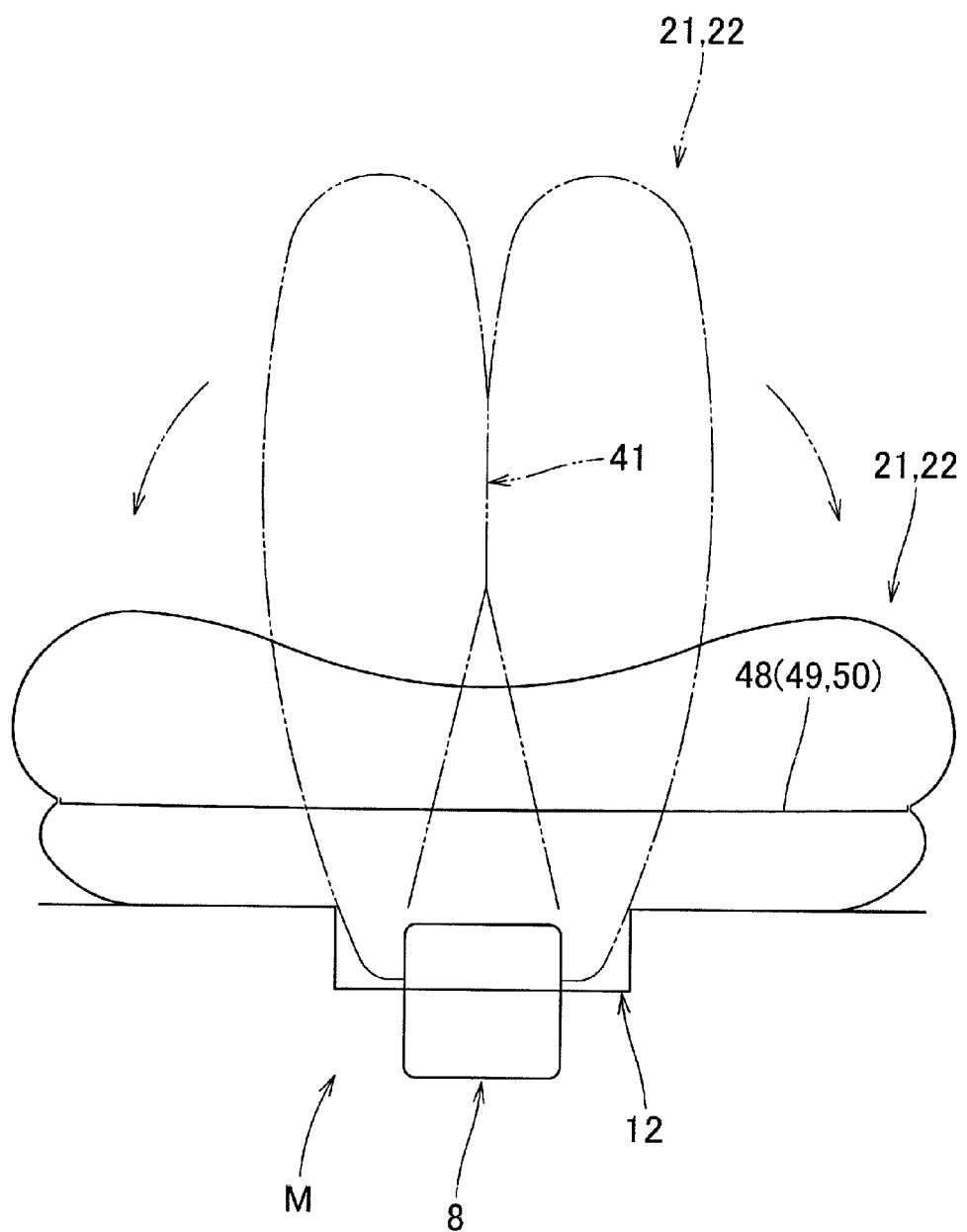
FIG. 13 is a schematic diagram showing the inflation process of the airbag of the embodiment as used in an airbag apparatus for a front passenger's seat.

In this embodiment, the airbag body 22 internally includes the vertical tether 41 that connects the front end 37*a* of the recessed area 37 and the periphery of the gas inlet port 29 and horizontal tethers 48 that connect the left side wall 26 and right side wall 27 of the circumferential wall 23. With this configuration, in an initial stage of airbag deployment, the vertical tether 41 pulls the front end 37*a* of the recessed area 37 forward and prevents a region of the bag body 22 around the front end 37*a* of the recessed area 37 from protruding toward a passenger MP unduly, and then the horizontal tethers 48 prevent the bag body 22 from unfurling in a left and right direction too much. More specifically, when the bag body 22 begins to inflate with an inflation gas, the bag body 22 firstly develops rearward in a thin state with a little gas inside, as indicated by double-dotted lines in FIG. 13. The rearward protrusion of the bag body 22 then stops when the vertical tether 41 fully tautens, and then the vertical tether 41 is pulled forward due to rebound action, such that the bag body 22 unfurls in a left and right direction and the left side wall 26 and right side wall 27 are separated from each other. If the bag body 22 is not provided with the horizontal tethers 48, the bag body would unfurl further in a left and right direction and then protrude rearward in such a manner as to expand in a front and rear direction due to subsequent rebound action, and would complete inflation while oscillating after repeating rearward protrusion and lateral expansion due to rebound actions. However, since the airbag 21 is internally provided with the horizontal tethers 48 that connect the left side wall 26 and right side wall 27, the tethers 48 will prevent the left side wall 26 and right side wall 27 from separating from each other unduly as shown in FIG. 13, and will help prevent the repetition of rebound actions of rearward protrusion and lateral expansion and oscillating motion of the bag body 22.

Especially, since the horizontal tethers 48 of the airbag 21 are located above and below the vertical tether 41, the clearance between the left side wall 26a and right side wall 27 are adequately controlled by the horizontal tethers 48 in a wide range in an up and down direction. Thus the bag body 22 of the airbag 21 is capable of controlling its shape in an initial stage of deployment with the vertical tether 48 which prevents rearward protrusion and with the horizontal tethers 48 (the upper horizontal tether 49 and lower horizontal tether 50) which prevent undue expansion in a left and right direction, and accordingly is capable of inflating quickly.

Therefore, the airbag 21 is capable of inflating quickly while controlling its shape in an initial stage of deployment.

Figure 14A:
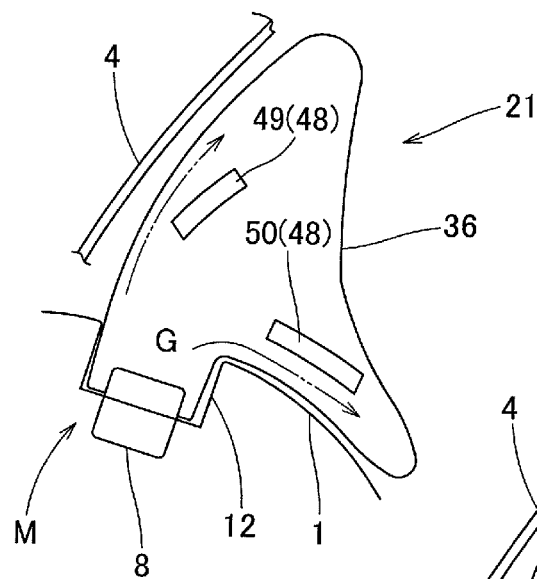
FIGS. 14A, 14B and 14C schematically depict the inflation process of the airbag of the embodiment as used in an airbag apparatus for a front passenger's seat.
Figure 14B:
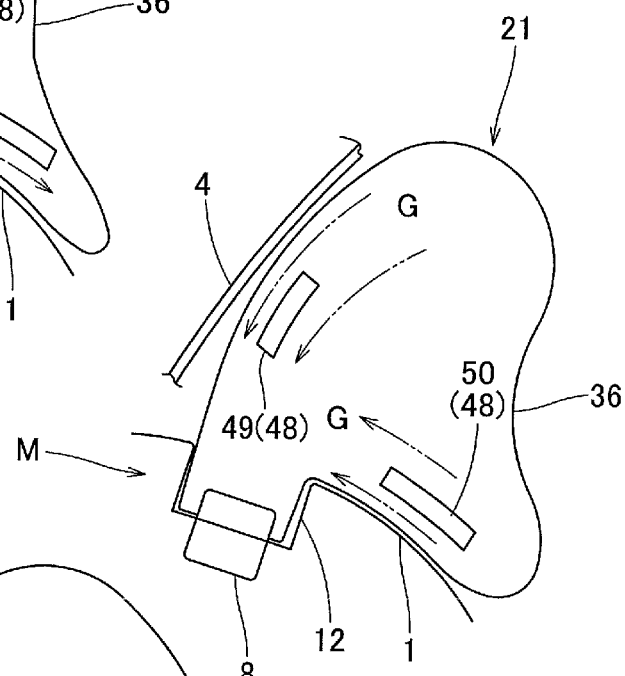
Figure 14C:
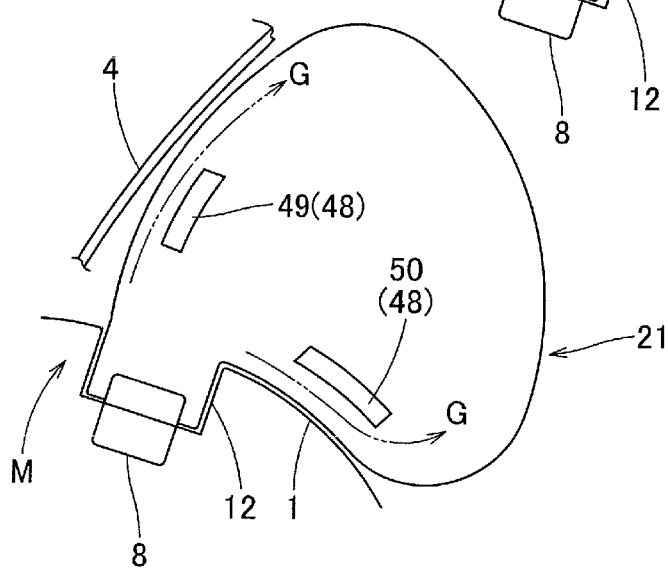

In the airbag 21, since each of the horizontal tethers 48 (the upper horizontal tether 49 and lower horizontal tether 50) is fabricated of a flexible sheet material and formed generally into a band, the tethers 48 connect the left side wall 26 and right side wall 27 over a wide range and reduce the volume of the bag body 22, thus helps shorten the time taken till full inflation. Moreover, in the airbag 21, the upper horizontal tether 49, which is located above the vertical tether 41, is so slanted off a front and rear direction as viewed from a side that the rear end 49b is located above the front end 49a at airbag deployment, whereas the lower horizontal tether 50 is so slanted off a front and rear direction as viewed from a side that the rear end 50b is located below the front end 50a at airbag deployment. With this configuration, as shown in FIG. 14A, in an initial stage of airbag inflation, the upper and lower horizontal tethers 49 and 50 will direct an inflation gas G introduced from the gas inlet port 29 rear- and upward and rear- and downward, toward the passenger side wall 36, respectively, thereby unfurl the bag body 22 quickly in an up and down direction. When the inflation gas having reached the passenger side wall 36 turns and flows forward, the tethers 49 and 50 will direct the gas as shown in FIG. 14B. That is, the tethers 49 and 50 serve as redirecting cloths of an inflation gas, and therefore, the airbag 21 will not require any redirecting cloths which would otherwise need to be separately provided, thus reducing the number of parts.

Without considering such an advantage, the tethers may be comprised of a cord-like member instead of a sheet of band. The arranging directions of the upper and lower horizontal tethers should not be limited to the embodiment. For example, the upper horizontal tether may be so arranged as to fall rearward as viewed from a side whereas the lower horizontal tether may be so arranged as to rise rearward as viewed from a side. Although the upper and lower horizontal tethers of this embodiment are straight as viewed from a side of the bag body at full inflation, they may be bent downward at the rear section as viewed from a side, as indicated by double-dotted lines in FIG. 15, as long as the tether forms a plane as a whole. Although this configuration will not show a redirecting effect so much in redirecting an inflation gas having once reached the passenger side wall forward, it will increase the length of the joint of the tether(s) to the left and right side walls. Therefore, the configuration will reduce the volume of the bag body further.

Moreover, since the upper horizontal tether 49 is designed to extend generally in parallel to the windshield 4 of a vehicle located above the instrument panel 1 at airbag deployment, the tether 49 will direct an inflation gas G fed to the bag body 22 to flow through the tether 49 and an upper area of the circumferential wall 23 (i.e., the upper side wall 24), along the windshield 4, thus preventing the gas from heading toward a passenger. Without considering such an advantage, the upper horizontal tether may be arranged to intersect the windshield.

As shown in FIG. 15, furthermore, the lower horizontal tether 50 in the foregoing embodiment is designed to extend generally in parallel to a tangential direction D1 at generally a center of a curve of an area of the rear plane 3 of the dashboard 1 to contact with the bag body 22, when the bag body 22 completes deployment and contacts the rear plane 3 of the dashboard 1 which curves in such a manner as to protrude rearward. With this configuration, the lower horizontal tether 50 will direct an inflation gas G fed to the bag body 22 to flow through the tether 50 and a lower area of the circumferential wall 23 (i.e., the lower side wall 25), along the rear plane 3 of the dashboard 1, and prevent the gas from heading toward a passenger. Without considering such an advantage, the lower horizontal tether may be arranged to intersect the tangential direction to the dashboard.

In the foregoing embodiment, moreover, the airbag 21 includes the exhaust hole 34 that can be opened and closed by the open/close element 84, such that the airbag 21 is deployable either in an open mode where the exhaust hole 34 is open or in a closed mode where the exhaust hole 34 is closed. With this configuration, an internal pressure of the airbag 21 can be controlled at airbag deployment.

More specifically, in the foregoing embodiment, if the control device 87 detects, for example, that an undersized passenger MP1 is seated in a front passenger's seat or that a passenger MP is seated proximate the dashboard 1 by signals fed from the sensors 88, 89 and 90, it feeds an actuating signal to the actuator 17 of the anchor structure 15 generally simultaneously to the inflator 8, to retract the anchor pin 16. Then as shown in FIGS. 18 and 19, the airbag 21 deploys in an open mode where the exhaust hole 34 is opened so an extra inflation gas is emitted therefrom. Accordingly, the airbag 21 will inflate with a suppressed internal pressure and cushion the undersized passenger MP1 or the passenger seated proximate the dashboard 1 softly without applying them undue pressure.

To the contrary, if the control device 87 detects, for example, that a large passenger MP2 is seated in a front passenger's seat or a passenger MP is seated away from the dashboard 1, the control device 87 will not feed an actuating signal to the actuator 17, such that the airbag 21 inflates and deploys in a closed mode where the exhaust hole 34 is closed as shown in FIGS. 16 and 17. Since the airbag 21 will complete inflation without releasing any inflation gas and with a high internal pressure, the airbag 21 will securely protect the large passenger MP2 or the passenger MP seated away from the dashboard 1 with a sufficient cushioning property, without bottoming out.

The embodiment described above may also be applied to an airbag which is not provided with a pressure control mechanism. Although the airbag 21 in the foregoing embodiment includes the exhaust hole 34 so as to operate in dual modes, opposite ends of each of the upper horizontal tether 49 and lower horizontal tether 50 are jointed to within areas of the left side wall 34 and right side wall 35 rearward relative to the exhaust hole 34 (on the side of the passenger side wall 36 relative to the exhaust hole 34). With this configuration, in either mode, the clearance between the left side wall 26 and right side wall 27 will be adequately limited by the upper and lower horizontal tethers 49 and 50, thereby preventing the bag body 22 from expanding in a left and right direction unduly at deployment. With the upper and lower horizontal tethers 49 and 50 connecting the left side wall 26 and right side wall 27, the volume of the airbag 21 will be reduced in comparison with a conventional airbag, and accordingly the time taken till full inflation will be reduced by 40 to 50% in comparison with a conventional airbag which is not provided with a horizontal tether. Furthermore, since the horizontal tethers 48 are located on the circumferential wall 23, the tethers 48 will reduce the volume of the airbag 21 without reducing a passenger protection area (i.e. the passenger side wall) which will actually cushion a passenger at deployment.

In the foregoing embodiment, the vertical tether 41 is comprised of two members; the front section 42 that is deployable on the side of the circumferential wall 23 and the rear section 46 deployable on the side of the passenger side wall 36. The front section 42 is jointed (sewn) to the bag body 22 at an entire periphery of the gas inlet port 29 (at a periphery of the gas inlet port 29 and by an area extending in a left and right direction). With this configuration, if, in an initial stage of airbag deployment, the front end 37*a* of the recessed area 37 is pulled rearward intensely along with the deployment of the passenger side wall 36, the pull force will be received by a front region of the front section 42 that is jointed to the bag body 22 by a wide area in a left and right direction. Accordingly, the vertical tether 41 will be prevented from moving toward a passenger along with the deployment of the passenger side wall 36, thus prevent the front end 37*a* of the recessed area 37 from moving rearward unduly in a secure fashion. The location to join the front section 42 of the vertical tether 41 to the bag body 22 should not be limited to the periphery of the gas inlet port. By way of example, the vertical tether may be configured to bifurcate from the joint with the rear section such that each front end of the bifurcation be joined to the left side wall and right side wall of the circumferential wall by an area extending in a left and right direction in the periphery of the gas inlet port.

Although the foregoing embodiment has been described as applied to a top-mount airbag for a front passenger's seat, the airbag according to the invention should not be limited thereby, but may also be applied to a mid-mount airbag for a front passenger's seat.

What is claimed is:

1. An airbag for a front passenger's seat of a vehicle, the airbag comprising:
    A folded-up bag body adapted to be mounted on an instrument panel located in front of a front passenger's seat for rearward deployment, the bag body being inflatable generally into a square cone whose top is at a front end of the bag body and including:
    a passenger side-wall deployable at a rear end of the bag body generally vertically and toward the front passenger seat;
    a circumferential wall extending toward the front end of the bag body from a peripheral edge of the passenger side wall while tapering;
    a gas inlet port located proximate the front end of the bag body as inflated for introducing an inflation gas; and
    a recessed area that is sunken forward and extends vertically generally at the center in a left and right direction of the passenger side wall;
    an upper horizontal tether that is located inside the bag body and connects a left side wall and a right side wall of the circumferential wall which oppose each other in a left and right direction, the upper horizontal tether being deployable generally along a left and right direction in order to limit a clearance between the left side wall and right side wall at airbag deployment; and
    a lower horizontal tether that is located inside the bag body and connects the left side wall and the right side wall of the circumferential wall, the lower horizontal tether being deployable generally along a left and right direction in order to limit the clearance between the left side wall and right side wall at airbag deployment,
    wherein
    the upper and lower horizontal tethers are fabricated of a flexible sheet material and formed generally into a band;
    the upper horizontal tether is so slanted off a front and rear direction as viewed from a side that a rear end of the upper horizontal tether is located above a front end of the upper horizontal tether at airbag deployment; and
    the lower horizontal tether is so slanted off a front and rear direction as viewed from the side that a rear end of the lower horizontal tether is located below a front end of the lower horizontal tether at airbag deployment.

2. The airbag for a front passenger's seat as set forth in claim 1, wherein the upper horizontal tether extends generally in parallel to a windshield of a vehicle located above the instrument panel at airbag deployment.

3. The airbag for a front passenger's seat as set forth in claim 1, wherein, when the bag body deploys and contacts a rear plane of an upper surface of the instrument panel which curves in such a manner as to protrude rearward, the lower horizontal tether extends generally in parallel to a tangential direction at generally a center of a curve of an area of the rear plane of the upper surface of the instrument panel to contact with the bag body.

4. The airbag for a front passenger's seat as set forth in claim 1, wherein:
    the airbag includes either on the left side wall or on the right side wall an exhaust hole that can be opened and closed by an open/close element such that the airbag is deployable either in an open mode where the exhaust hole is open or in a closed mode where the exhaust hole is closed; and
    opposite ends of each of the upper horizontal tether and lower horizontal tether are jointed to within areas of the left side wall and right side wall on the side of the passenger side wall relative to the exhaust hole.

5. The airbag for a front passenger's seat as set forth in claim 1 adapted to a top-mount airbag apparatus which is mountable on an interior of a top plane of the instrument panel.

6. The airbag for a front passenger's seat as set forth in claim 1, further comprising
    a vertical tether located inside the airbag body for pulling a front end of the recessed area forward at airbag deployment, for controlling a shape of the bag body as inflated;
    the vertical tether is located between the upper horizontal tether and the lower horizontal tether.

7. The airbag for a front passenger's seat as set forth in claim 6, wherein
    the vertical tether is comprised of two members: a front section that is deployable on the side of the circumferential wall and a rear section deployable on the side of the passenger side wall;
    the front section is jointed to the bag body at a periphery of the gas inlet port and by an area extending in a left and right direction;
    the front section comprises a joint section at the front end of the bag body; and
    the joint section is jointed to the bag body by an entire circumference of the gas inlet port.

* * * * *